US008503781B2

(12) United States Patent
Chen et al.

(10) Patent No.: US 8,503,781 B2
(45) Date of Patent: Aug. 6, 2013

(54) FINDING TEXT REGIONS FROM COLOURED IMAGE INDEPENDENT OF COLOURS

(75) Inventors: Yu-Ling Chen, Epping (AU); Kailash Nandish Ballu, Burwood (AU)

(73) Assignee: Canon Kabushiki Kaisha, Tokyo (JP)

( * ) Notice: Subject to any disclaimer, the term of this patent is extended or adjusted under 35 U.S.C. 154(b) by 32 days.

(21) Appl. No.: 13/324,762

(22) Filed: Dec. 13, 2011

(65) Prior Publication Data

US 2012/0155754 A1    Jun. 21, 2012

(30) Foreign Application Priority Data

Dec. 17, 2010    (AU) ............................... 2010257298

(51) Int. Cl.
*G06K 9/34* (2006.01)

(52) U.S. Cl.
USPC .......................................... 382/176; 382/164

(58) Field of Classification Search
USPC ................. 382/162, 164, 168, 170, 173, 176, 382/180, 224, 286
See application file for complete search history.

(56) References Cited

U.S. PATENT DOCUMENTS

| 5,588,072 | A | | 12/1996 | Wang |
| 5,774,579 | A | * | 6/1998 | Wang et al. .................... 382/176 |
| 5,889,886 | A | * | 3/1999 | Mahoney ....................... 382/176 |
| 5,892,843 | A | * | 4/1999 | Zhou et al. ..................... 382/176 |
| 6,327,384 | B1 | | 12/2001 | Hirao et al. |
| 7,298,920 | B2 | | 11/2007 | Zuniga |
| 7,570,811 | B2 | * | 8/2009 | Marquering et al. ......... 382/173 |

* cited by examiner

*Primary Examiner* — Phuoc Tran
(74) *Attorney, Agent, or Firm* — Canon USA Inc. IP Division

(57) ABSTRACT

Methods (1200), apparatuses, and computer program for finding a region containing text in a color bitmap image comprising pixels are provided. Connected components (CCs) are generated (1200) from the color bitmap image by grouping substantially similarly colored and adjacent pixels. Independently of color, which of the connected components are text connected components are determined (1212) dependent upon attributes of the generated connected components. For each text CC) a value is assigned (1214) to each tile that comprises at least a portion of the text connected component. The value indicates the presence of text overlapping the tile. Each tile comprises pixels of the color bitmap image. The region containing text in the color bitmap image is determined (1216) dependent upon the assigned values of the tiles.

20 Claims, 14 Drawing Sheets

FINDING TEXT REGIONS FROM COLOURED IMAGE INDEPENDENT OF COLOURS

REFERENCE TO RELATED PATENT APPLICATION

This application claims the benefit under 35 U.S.C. §119 of the filing date of Australian Patent Application No. 2010257298, filed 17 Dec. 2010 in the name of Canon Kabushiki Kaisha, hereby incorporated by reference in its entirety as if fully set forth herein.

TECHNICAL FIELD

The current invention relates to scan processing and in particular to extracting text regions from a colour document image.

BACKGROUND

Extracting one or more text regions on a page is an important step in document analysis and is a precursor to text processing in optical character recognition (OCR) modules.

Typically, one or more preprocessing steps precede text region extraction in colour documents. Such preprocessing steps can include: binarisation or another form of colour quantisation; various forms of noise reduction or suppression; contrast enhancement; and geometric normalisation processing such as deskewing, for example. Thus, text region extraction is typically performed on preprocessed images that contain a reduced number of colours compared to the original digitised image. Such images are referred to as "colour-quantised" images.

One known approach to extract text regions involves analysing the peaks and valleys of a projection profile on a binarised document image. In the binarised image, all the text pixels are assumed to be black or '0', and all the non-text pixels are assumed to be white or '1'. In the input document image, peaks correspond to text lines, and valleys correspond to the gaps between the text lines. Text regions can be identified by finding periodic patterns of peaks and valleys. This method performs efficiently for black and white documents, which have a simple layout, but for a colour document, binarisation can fail to correctly distinguish between text and non-text pixels. Also, if the document has a complex layout, with both vertical and horizontal text, peaks and valleys in projection profiles that are necessary to extract text regions can be hard to isolate.

Another known approach for text region extraction involves segmenting the document image into connected components (CCs) and classifying each connected component as text or non-text based on statistics pertaining to that CC, such as height, width, and number of pixels. Neighbouring text CCs can be grouped to form text lines based on the statistical properties of text CCs and the gaps between the text CCs. Although this approach is generally not affected by text and background colour combinations compared to the aforementioned binarisation approach, this approach tends to find more false positive text regions. A significant drawback of a CC-based method is that, unlike the projection profile analysis method, the CC-based method cannot exploit intrinsic text layout features, such as the periodicity of text lines and words.

There is a need to alleviate the aforementioned problems in extracting text regions from a document image.

SUMMARY

In accordance with an aspect of the invention, there is provided a method of finding a region containing text in a colour bitmap image comprising a plurality of pixels. The method comprises the steps of: generating connected components (CCs) from the colour bitmap image by grouping substantially similarly coloured and adjacent pixels; determining, independently of colour, which of the connected components are text connected components dependent upon attributes of the generated connected components; assigning, for each text connected component (CC), a value to each tile that comprises at least a portion of the text connected component, the value indicating the presence of text overlapping the tile, each tile comprising a plurality of pixels of the colour bitmap image; and determining the region containing text in the colour bitmap image dependent upon the assigned values of the tiles.

The method may comprise dividing the colour bitmap image into a plurality of tiles.

The value indicating the presence of text overlapping the tile may comprise a text pixel density of the text connected component in the tile, or a text CC count density of the text connected component in the tile.

The assigning step may comprise: initialising geometric distribution statistics contained in each tile; for each text CC, generating and distributing statistical measures pertaining to the current text CC into the geometric distribution statistics of each tile that is overlapped by the current text CC; and for each tile, finalising the geometric distribution statistics of the current tile.

The generating and distributing step may comprise: calculating the number of overlapped tiles; dividing a text pixel count by the number of overlapped tiles; accumulating the divided text pixel count to a corresponding text total pixel count in all overlapped tiles; accumulating a fraction of one divided by the number of overlapped tiles to the corresponding text CC count in all overlapped tiles; and updating a corresponding minimum pixel count of a text CC and a maximum pixel count of a text CC by the divided text pixel count in all overlapped tiles.

The finalising step may comprise: setting the average number of pixels per text CC in the tile by the value of dividing the total text pixel count by text CC count in each tile; and setting the tile text pixel density by the value of dividing the total text pixel count by the total number of pixels in the tile.

The region determining step may comprise dividing an initial region into one or more regions comprising text dependent upon average pixel densities along rows and columns of tiles in a text region.

The region determining step may comprise: creating an initial text region; and wherein the dividing step comprises, for each region: calculating average pixel densities along rows and columns of tiles in the current text region; determining if the current text region should be split dependent upon the calculated average pixel densities; and splitting the current region into at least two regions if the current region is determined should be split.

The region determining step may comprise growing one or more text regions comprising text using one or more tiles comprising text. The region determining step may comprise: creating an empty list to hold text regions; and wherein the growing step comprises, for each tile containing text: generating a list of probable text regions that the current tile might belong to; providing a text region dependent upon the list of probable text regions; and adding the current tile to the text region and adding the text region to the list to hold text regions.

The method may further comprise the step of refining text connected components dependent upon noise characteristics, wherein text and noise in the colour bitmap image are discriminated. The noise may comprise at least one of watermark, texture, and halftone noise.

The text CC refining step may comprise: receiving geometric distribution statistics for each tile; and determining noise characteristics of the colour bitmap image dependent upon geometric distribution statistics in each tile, the noise in the colour bitmap image being either primarily watermark noise or non-watermark noise. The noise characteristics determining step may comprise: profiling the geometric distribution statistics in each tile to determine characteristics of noise; and identifying locations of noise based on the characteristics of noise. The method may comprise reclassifying text CCs matching the noise characteristics at the locations. The profiling step may comprise: forming a histogram on an average text pixel count per text CC in each tile, wherein bins are partitioned to capture characteristics of noise; and collecting statistics in each bin including at least one of maximum text pixel count per text CC of an included tile, included tile count, mean of text pixel count per text CC per included tile, standard deviation of text pixel count per text CC per included tile, mean of text CC count per included tile and standard deviation of text CC count per included tile.

The identifying step may comprise: determining the type of majority noise based on an identity of the largest bin, the type of noise being categorised into watermark noise and non-watermark noise; deriving at least one text CC count threshold and at least one text pixel count per text CC threshold from the statistics of the largest bin if the type of majority noise is determined to be watermark noise; marking tiles with the geometric statistics satisfying the at least one text CC count threshold and at least one text pixel count per text CC threshold as noisy tiles; marking tiles adjacent to the noisy tiles with the geometric statistics close to the at least one text CC count threshold and at least one text pixel count per text CC threshold as noisy tiles; marking tiles with the geometric statistics indicating a dense cluster of small text CCs or a sparse cluster of very small text CCs as noisy tiles if the type of majority noise is determined to be non-watermark noise.

The matching step may check each text CC for combinations of these characteristics: a pixel count lower than the at least one pixel count per text CC threshold if the type of majority noise is determined to be watermark noise; a pixel count lower than a predetermined pixel count threshold if the type of majority noise is determined to be non-watermark noise; and a bounding box overlapping any noisy tiles for both noise types or a bounding box surrounded by more than three (3) noisy tiles if the type of majority noise is determined to be watermark noise.

In accordance with another aspect of the invention, there is provided an apparatus for finding a region containing text in a colour bitmap image comprising a plurality of pixels. The apparatus comprises: a memory for storing data and a computer program; and a processor unit coupled to the memory for executing a computer program, the memory and the processor configured to find the region containing text in the colour bitmap image. The computer program comprises: a computer program code module for generating connected components (CCs) from the colour bitmap image by grouping substantially similarly coloured and adjacent pixels; a computer program code module for determining, independently of colour, which of the connected components are text connected components dependent upon attributes of the generated connected components; a computer program code module for assigning, for each text connected component (CC), a value to each tile that comprises at least a portion of the text connected component, the value indicating the presence of text overlapping the tile, each tile comprising a plurality of pixels of the colour bitmap image; and a computer program code module for determining the region containing text in the colour bitmap image dependent upon the assigned values of the tiles.

In accordance with another aspect of the invention, there is provided a computer readable storage medium having recorded therein a computer program for finding a region containing text in a colour bitmap image comprising a plurality of pixels. The computer program comprises: a computer program code module for generating connected components (CCs) from the colour bitmap image by grouping substantially similarly coloured and adjacent pixels; a computer program code module for determining, independently of colour, which of the connected components are text connected components dependent upon attributes of the generated connected components; a computer program code module for assigning, for each text connected component (CC), a value to each tile that comprises at least a portion of the text connected component, the value indicating the presence of text overlapping the tile, each tile comprising a plurality of pixels of the colour bitmap image; and a computer program code module for determining the region containing text in the colour bitmap image dependent upon the assigned values of the tiles.

BRIEF DESCRIPTION OF THE DRAWINGS

Embodiments of the invention are described hereinafter with reference to the following drawings, in which.

DETAILED DESCRIPTION

Figure 1:
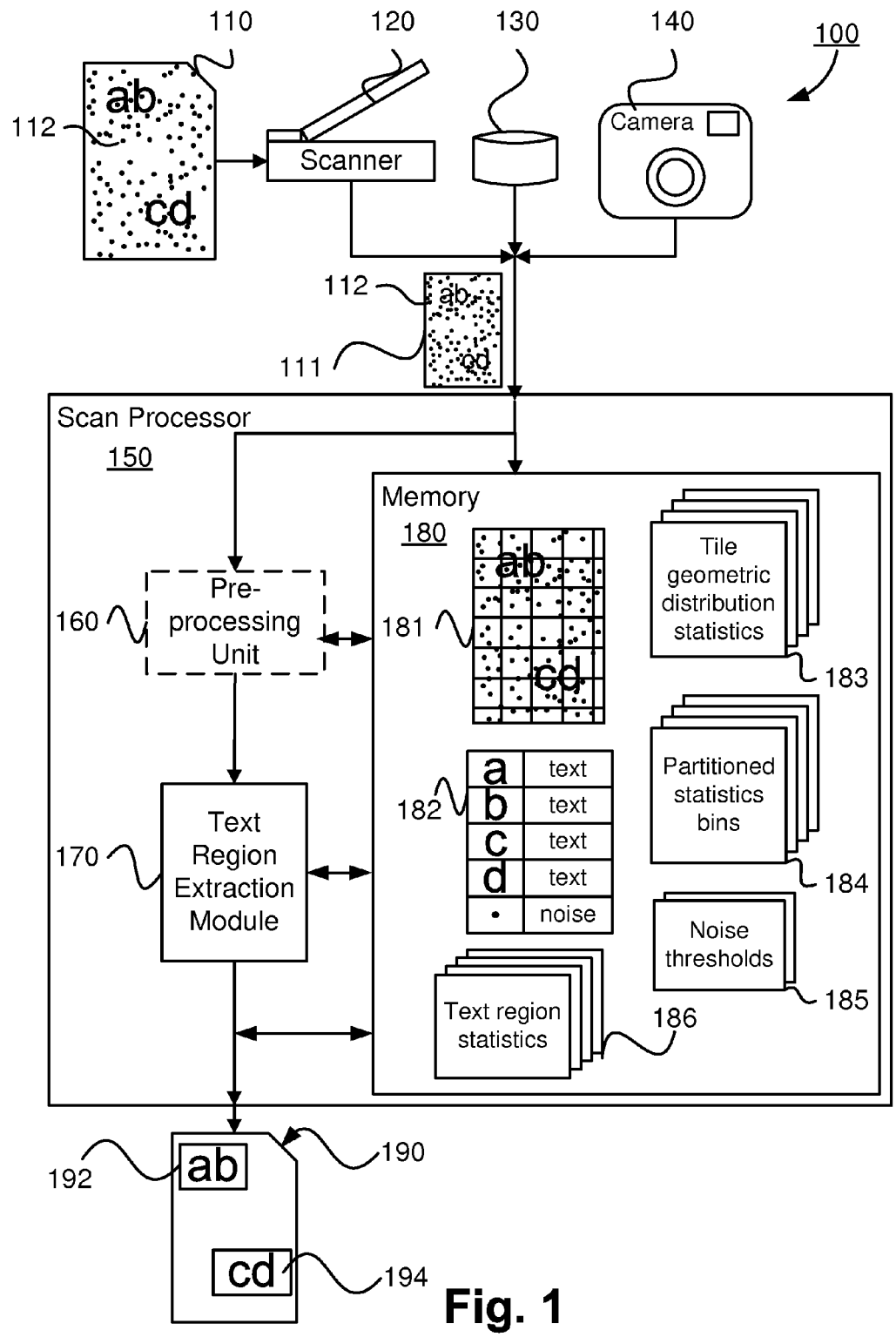
FIG. 1 is a functional block diagram of a system for finding one or more text regions in a colour bitmap image of a colour document.

Methods, apparatuses, and computer readable storage mediums for finding a region containing text in a colour bitmap image comprising a plurality of pixels are disclosed. In the following description, numerous specific details, including particular image sizes, computer system configurations, types of electronic documents, and the like are set forth. However, from this disclosure, it will be apparent to those skilled in the art that modifications and/or substitutions may be made without departing from the scope and spirit of the invention. In other circumstances, specific details may be omitted so as not to obscure the invention.

Where reference is made in any one or more of the accompanying drawings to steps and/or features, which have the same reference numerals, those steps and/or features have for the purposes of this description the same function(s) or operation(s), unless the contrary intention appears.

1. INTRODUCTION

The embodiments of the invention described hereinafter serve to find one or more text regions in a colour bitmap image of a document. In particular, the colour bitmap image of the document can be formed with coloured text being placed over a colour background, such as yellow text over an orange background for example. Alternatively, the characters of the text may be different colours over a background using varying colours. The colour bitmap image may be processed as an entire image and divided into tiles comprising smaller text regions, or the colour bitmap image can be divided into tiles first and then the tiles can be processed by merging to form larger text regions. Furthermore, aspects of the invention allow text and noise in a document to be discriminated to generate text regions. The noise may comprise one or more watermarks, texture of the image (i.e., non-text content portions of the image), and halftoning noise. Thus, the embodiments of the invention can find text pixels in a colour bitmap image and can discriminate text pixels from noise in the colour bitmap image.

Figure 12:
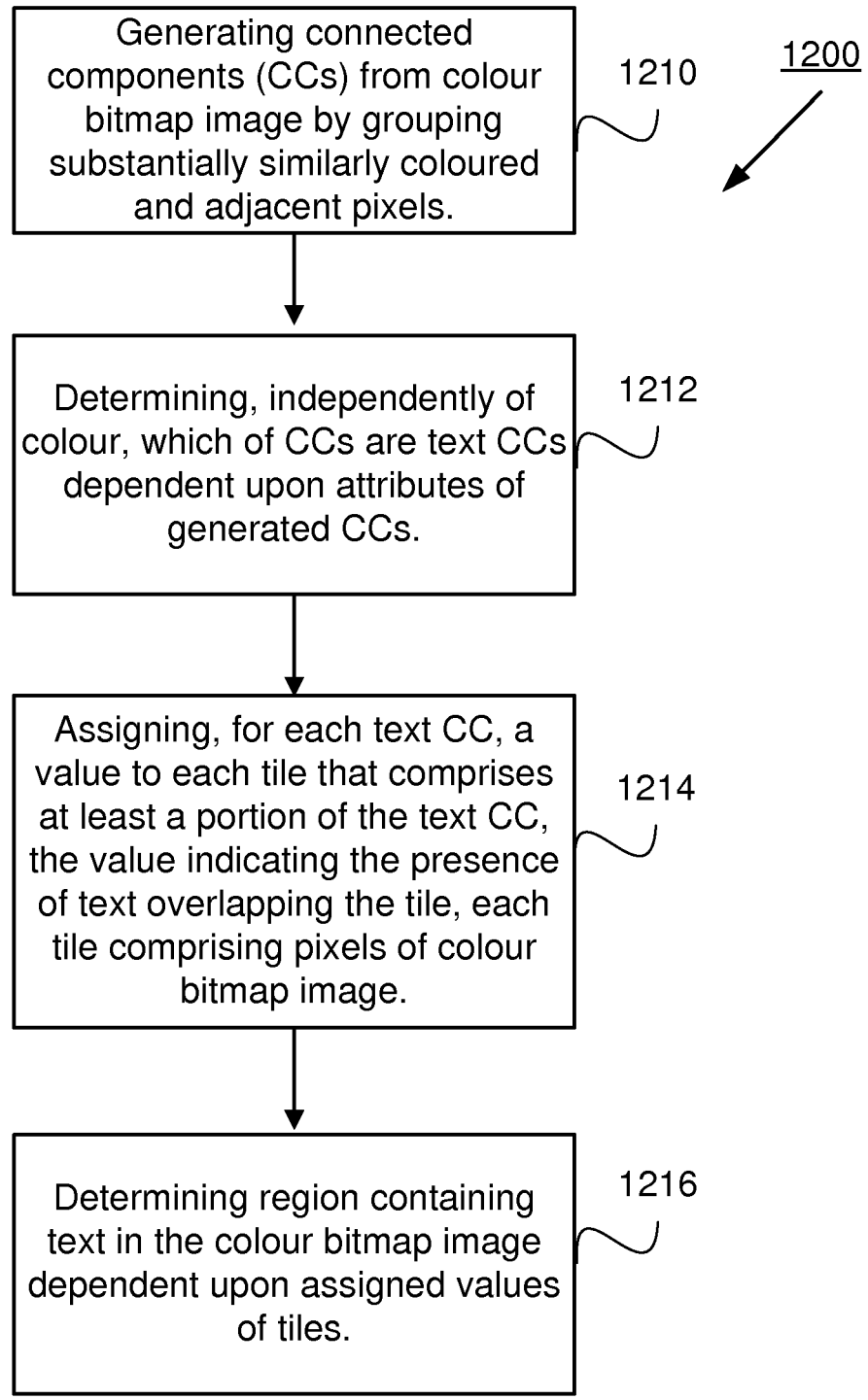
FIG. 12 is a high-level flow diagram of a method of finding one or more text regions in a colour bitmap image of a colour document.

In broad terms, an embodiment of the invention as shown in FIG. 12 provides a method 1200 of finding a region containing text in a colour bitmap image comprising a plurality of pixels. The method 1200 may be implemented using the general purpose computer 1300 shown in FIG. 13 and described in detail hereinafter. In step 1210, connected components (CCs) are generated using the processor 1305 of FIG. 13 from the colour bitmap image by grouping substantially similarly coloured and adjacent pixels. In step 1214, independently of colour, which of the connected components are text connected components are determined using the processor 1305 dependent upon attributes of the generated connected components. In step 1214, for each text connected component (CC), a value is assigned by the processor 1305 to each tile that comprises at least a portion of the text connected component. The value indicates the presence of text overlapping the tile, each tile comprising a plurality of pixels of the colour bitmap image. In step 1216, the region containing text in the colour bitmap image is determined dependent upon the assigned values of the tiles. The colour bitmap image may be divided into a plurality of tiles.

The value indicating the presence of text overlapping the tile may comprise a text pixel density of the text connected component in the tile, or a text CC count density of the text connected component in the tile.

The assigning step may comprise: initialising geometric distribution statistics contained in each tile; for each text CC, generating and distributing statistical measures pertaining to the current text CC into the geometric distribution statistics of each tile that is overlapped by the current text CC; and for each tile, finalising the geometric distribution statistics of the current tile. The generating and distributing step may comprise: calculating the number of overlapped tiles; dividing a text pixel count by the number of overlapped tiles; accumulating the divided text pixel count to a corresponding text total pixel count in all overlapped tiles; accumulating a fraction of one divided by the number of overlapped tiles to the corresponding text CC count in all overlapped tiles; and updating a corresponding minimum pixel count of a text CC and a maximum pixel count of a text CC by the divided text pixel count in all overlapped tiles. The finalising step may comprise: setting the average number of pixels per text CC in the tile by the value of dividing the total text pixel count by text CC count in each tile; and setting the tile text pixel density by the value of dividing the total text pixel count by the total number of pixels in the tile.

The region determining step may comprise dividing an initial region into one or more regions comprising text dependent upon average pixel densities along rows and columns of tiles in a text region. The region determining step may comprise creating an initial text region, wherein the dividing step may comprise, for each region: calculating average pixel densities along rows and columns of tiles in the current text region; determining if the current text region should be split dependent upon the calculated average pixel densities; and splitting the current region into at least two regions if the current region is determined should be split.

The region determining step may comprise growing one or more text regions comprising text using one or more tiles comprising text. The region determining step may comprise creating an empty list to hold text regions, wherein the growing step may comprise, for each tile containing text: generating a list of probable text regions that the current tile might belong to; providing a text region dependent upon the list of probable text regions; and adding the current tile to the text region and adding the text region to the list to hold text regions.

The method may further comprise the step of refining text connected components dependent upon noise characteristics, wherein text and noise in the colour bitmap image are discriminated. The noise may comprise at least one of watermark, texture, and halftone noise.

The text CC refining step may comprise receiving geometric distribution statistics for each tile, and determining noise characteristics of the colour bitmap image dependent upon geometric distribution statistics in each tile, the noise in the colour bitmap image being either primarily watermark noise or non-watermark noise. The noise characteristics determining step may comprise profiling the geometric distribution statistics in each tile to determine characteristics of noise, and identifying locations of noise based on the characteristics of noise. The method may further comprise reclassifying text CCs matching the noise characteristics at the locations. The profiling step may comprise: forming a histogram on an average text pixel count per text CC in each tile, wherein bins are partitioned to capture characteristics of noise; and collecting statistics in each bin including at least one of maximum text pixel count per text CC of an included tile, included tile count, mean of text pixel count per text CC per included tile, standard deviation of text pixel count per text CC per included tile, mean of text CC count per included tile and standard deviation of text CC count per included tile.

The identifying step may comprise: determining the type of majority noise based on an identity of the largest bin, the type of noise being categorised into watermark noise and non-watermark noise; deriving at least one text CC count threshold and at least one text pixel count per text CC threshold from the statistics of the largest bin if the type of majority noise is determined to be watermark noise; marking tiles with the geometric statistics satisfying the at least one text CC count threshold and at least one text pixel count per text CC threshold as noisy tiles; marking tiles adjacent to the noisy tiles with the geometric statistics close to the at least one text CC count threshold and at least one text pixel count per text CC threshold as noisy tiles; marking tiles with the geometric statistics indicating a dense cluster of small text CCs or a sparse cluster of very small text CCs as noisy tiles if the type of majority noise is determined to be non-watermark noise.

The matching step checks each text CC for combinations of these characteristics: a pixel count lower than the at least one pixel count per text CC threshold if the type of majority noise is determined to be watermark noise; a pixel count lower than a predetermined pixel count threshold if the type of majority noise is determined to be non-watermark noise; and a bounding box overlapping any noisy tiles for both noise types or a bounding box surrounded by more than three (3) noisy tiles if the type of majority noise is determined to be watermark noise.

Another embodiment of the invention is directed to an apparatus for finding a region containing text in a colour bitmap image comprising a plurality of pixels, the apparatus comprising: a memory for storing data and a computer program; and a processor unit coupled to the memory for executing a computer program.

A further embodiment of the invention is directed to computer readable storage medium having recorded therein a computer program for finding a region containing text in a colour bitmap image comprising a plurality of pixels.

Figure 13A:
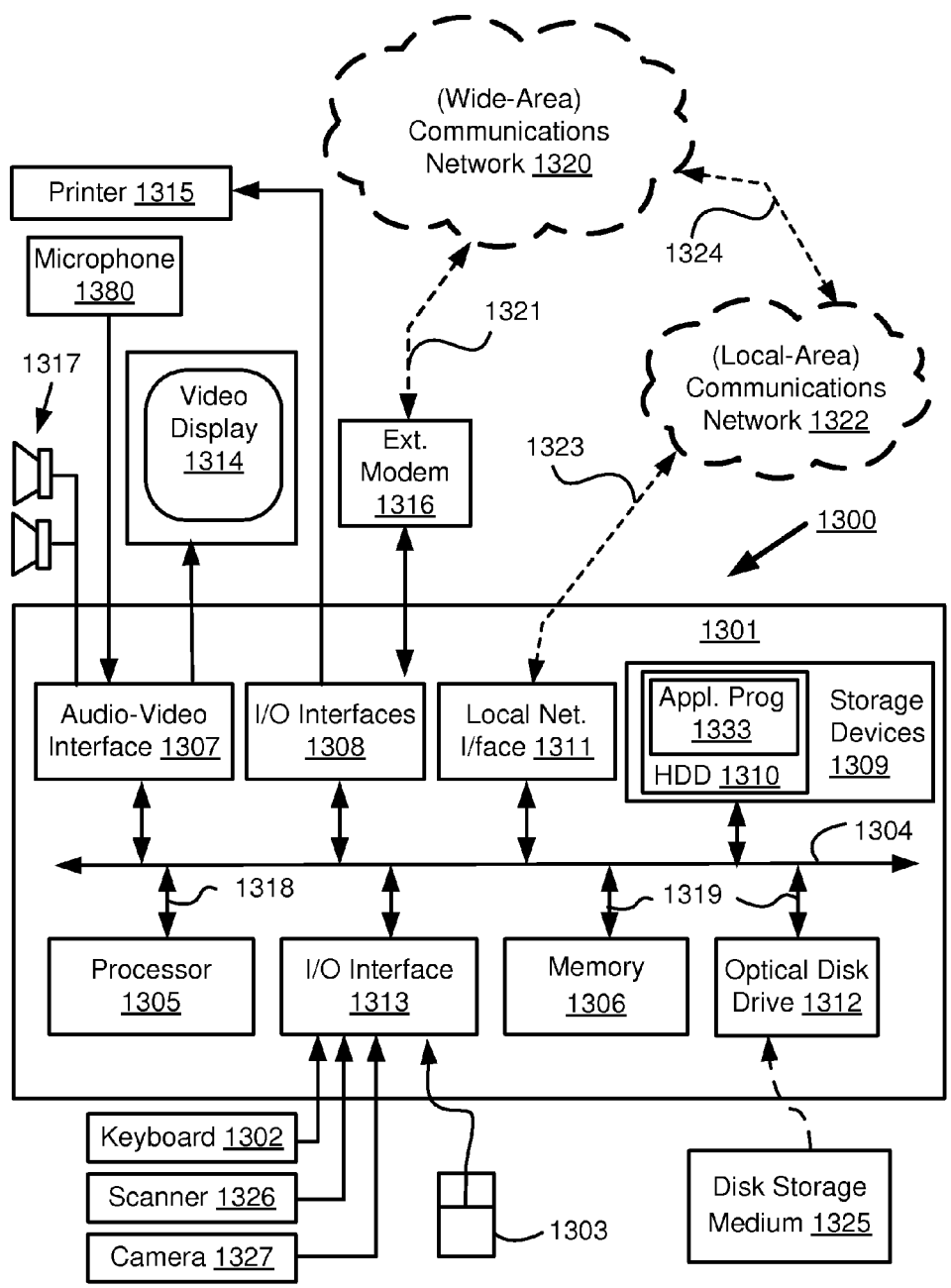
FIGS. 13A and 13B form a schematic block diagram of a general-purpose computer system upon which arrangements described can be practiced.
Figure 13B:
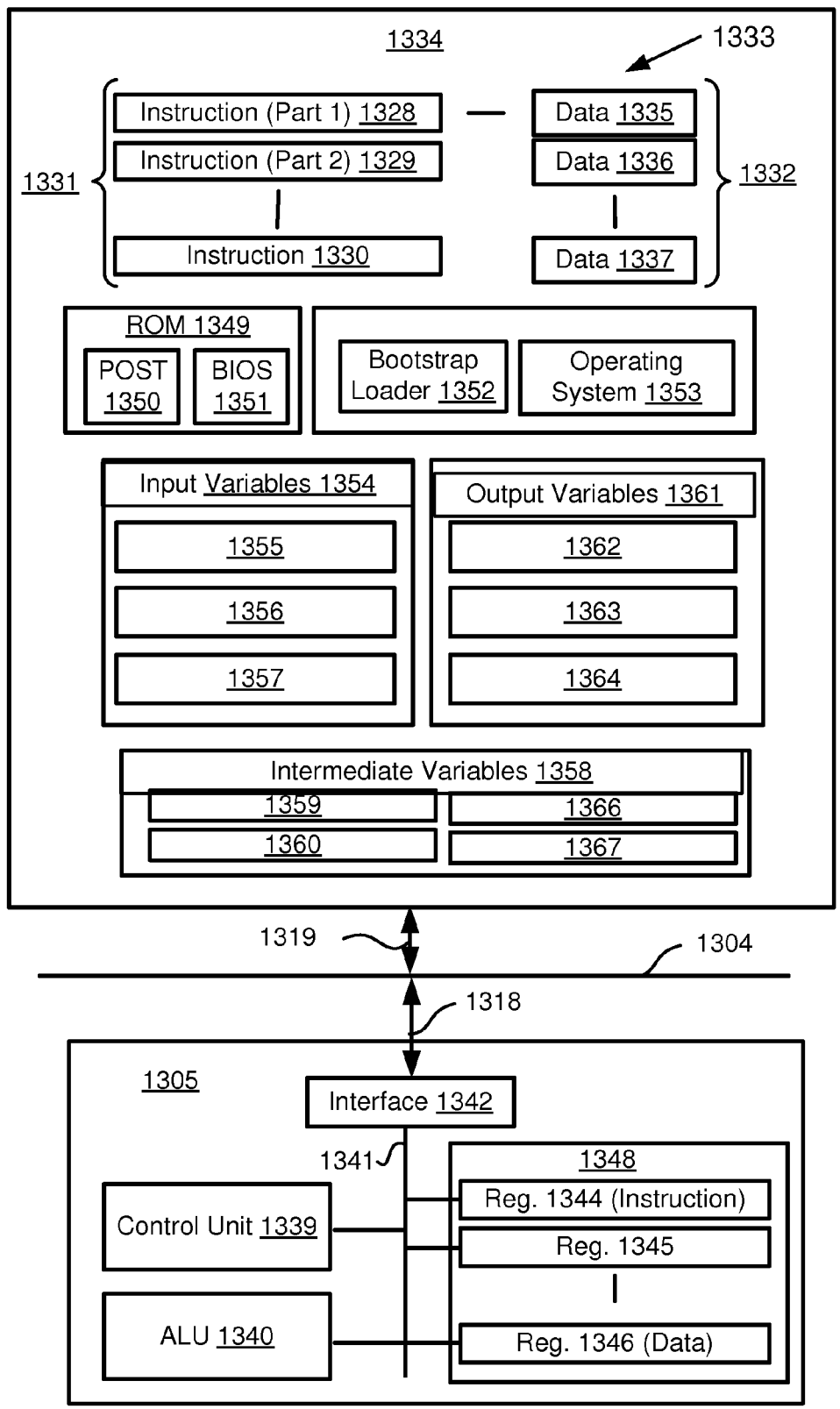

FIGS. 13A and 13B depict a general-purpose computer system 1300, upon which the various arrangements described can be practiced.

As seen in FIG. 13A, the computer system 1300 includes: a computer module 1301; input devices such as a keyboard 1302, a mouse pointer device 1303, a scanner 1326, a camera 1327, and a microphone 1380; and output devices including a printer 1315, a display device 1314 and loudspeakers 1317. An external Modulator-Demodulator (Modem) transceiver device 1316 may be used by the computer module 1301 for communicating to and from a communications network 1320 via a connection 1321. The communications network 1320 may be a wide-area network (WAN), such as the Internet, a cellular telecommunications network, or a private WAN. Where the connection 1321 is a telephone line, the modem 1316 may be a traditional "dial-up" modem. Alternatively, where the connection 1321 is a high capacity (e.g., cable) connection, the modem 1316 may be a broadband modem. A wireless modem may also be used for wireless connection to the communications network 1320.

The computer module 1301 typically includes at least one processor unit 1305, and a memory unit 1306. For example, the memory unit 1306 may have semiconductor random access memory (RAM) and semiconductor read only memory (ROM). The computer module 1301 also includes an number of input/output (I/O) interfaces including: an audio-video interface 1307 that couples to the video display 1314, loudspeakers 1317 and microphone 1380; an I/O interface 1313 that couples to the keyboard 1302, mouse 1303, scanner 1326, camera 1327 and optionally a joystick or other human interface device (not illustrated); and an interface 1308 for the external modem 1316 and printer 1315. In some implementations, the modem 1316 may be incorporated within the computer module 1301, for example within the interface 1308. The computer module 1301 also has a local network interface 1311, which permits coupling of the computer system 1300 via a connection 1323 to a local-area communications network 1322, known as a Local Area Network (LAN). As illustrated in FIG. 13A, the local communications network 1322 may also couple to the wide network 1320 via a connection 1324, which would typically include a so-called "firewall" device or device of similar functionality. The local network interface 1311 may comprise an Ethernet™ circuit card, a Bluetooth™ wireless arrangement or an IEEE 802.11 wireless arrangement; however, numerous other types of interfaces may be practiced for the interface 1311.

The I/O interfaces 1308 and 1313 may afford either or both of serial and parallel connectivity, the former typically being implemented according to the Universal Serial Bus (USB) standards and having corresponding USB connectors (not illustrated). Storage devices 1309 are provided and typically include a hard disk drive (HDD) 1310. Other storage devices such as a floppy disk drive and a magnetic tape drive (not illustrated) may also be used. An optical disk drive 1312 is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the system 1300.

The components 1305 to 1313 of the computer module 1301 typically communicate via an interconnected bus 1304 and in a manner that results in a conventional mode of operation of the computer system 1300 known to those in the relevant art. For example, the processor 1305 is coupled to the system bus 1304 using a connection 1318. Likewise, the memory 1306 and optical disk drive 1312 are coupled to the system bus 1304 by connections 1319. Examples of computers on which the described arrangements can be practised include IBM-PC's and compatibles, Sun Sparcstations, Apple Mac™ or a like computer systems.

The method of finding a region containing text in a colour bitmap image comprising a plurality of pixels may be implemented using the computer system 1300 wherein the processes of FIGS. 1 to 11, to be described, may be implemented as one or more software application programs 1333 executable within the computer system 1300. In particular, the steps of the method of finding a region containing text in a colour bitmap image comprising a plurality of pixels are effected by instructions 1331 (see FIG. 13B) in the software 1333 that are carried out within the computer system 1300. The software instructions 1331 may be formed as one or more code modules, each for performing one or more particular tasks. The software may also be divided into two separate parts, in which a first part and the corresponding code modules performs the method of finding a region containing text in a colour bitmap image comprising a plurality of pixels and a second part and the corresponding code modules manage a user interface between the first part and the user.

The software may be stored in a computer readable medium, including the storage devices described below, for example. The software is loaded into the computer system 1300 from the computer readable medium, and then executed by the computer system 1300. A computer readable medium having such software or computer program recorded on the computer readable medium is a computer program product. The use of the computer program product in the computer system 1300 preferably effects an advantageous apparatus for finding a region containing text in a colour bitmap image comprising a plurality of pixels.

The software 1333 is typically stored in the HDD 1310 or the memory 1306. The software is loaded into the computer system 1300 from a computer readable medium, and executed by the computer system 1300. Thus, for example, the software 1333 may be stored on an optically readable disk storage medium (e.g., CD-ROM) 1325 that is read by the optical disk drive 1312. A computer readable medium having such software or computer program recorded on it is a computer program product. The use of the computer program product in the computer system 1300 preferably effects an apparatus for finding a region containing text in a colour bitmap image comprising a plurality of pixels.

In some instances, the application programs 1333 may be supplied to the user encoded on one or more CD-ROMs 1325 and read via the corresponding drive 1312, or alternatively may be read by the user from the networks 1320 or 1322. Still further, the software can also be loaded into the computer system 1300 from other computer readable media. Computer readable storage media refers to any non-transitory tangible storage medium that provides recorded instructions and/or data to the computer system 1300 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 1301. Examples of transitory or non-tangible computer readable transmission media that may also participate in the provision of software, application programs, instructions and/or data to the computer module 1301 include radio or infra-red transmission channels as well as a network connection to another computer or networked device, and the Internet or Intranets including e-mail transmissions and information recorded on Websites and the like.

The second part of the application programs 1333 and the corresponding code modules mentioned above may be executed to implement one or more graphical user interfaces (GUIs) to be rendered or otherwise represented upon the display 1314. Through manipulation of typically the keyboard 1302 and the mouse 1303, a user of the computer system 1300 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1317 and user voice commands input via the microphone 1380.

FIG. 13B is a detailed schematic block diagram of the processor 1305 and a "memory" 1334. The memory 1334 represents a logical aggregation of all the memory modules (including the HDD 1309 and semiconductor memory 1306) that can be accessed by the computer module 1301 in FIG. 13A.

When the computer module 1301 is initially powered up, a power-on self-test (POST) program 1350 executes. The POST program 1350 is typically stored in a ROM 1349 of the semiconductor memory 1306 of FIG. 13A. A hardware device such as the ROM 1349 storing software is sometimes referred to as firmware. The POST program 1350 examines hardware within the computer module 1301 to ensure proper functioning and typically checks the processor 1305, the memory 1334 (1309, 1306), and a basic input-output systems software (BIOS) module 1351, also typically stored in the ROM 1349, for correct operation. Once the POST program 1350 has run successfully, the BIOS 1351 activates the hard disk drive 1310 of FIG. 13A. Activation of the hard disk drive 1310 causes a bootstrap loader program 1352 that is resident on the hard disk drive 1310 to execute via the processor 1305. This loads an operating system 1353 into the RAM memory 1306, upon which the operating system 1353 commences operation. The operating system 1353 is a system level application, executable by the processor 1305, to fulfil various high level functions, including processor management, memory management, device management, storage management, software application interface, and generic user interface.

The operating system 1353 manages the memory 1334 (1309, 1306) to ensure that each process or application running on the computer module 1301 has sufficient memory in which to execute without colliding with memory allocated to another process. Furthermore, the different types of memory available in the system 1300 of FIG. 13A must be used properly so that each process can run effectively. Accordingly, the aggregated memory 1334 is not intended to illustrate how particular segments of memory are allocated (unless otherwise stated), but rather to provide a general view of the memory accessible by the computer system 1300 and how such is used.

As shown in FIG. 13B, the processor 1305 includes a number of functional modules including a control unit 1339, an arithmetic logic unit (ALU) 1340, and a local or internal memory 1348, sometimes called a cache memory. The cache memory 1348 typically includes a number of storage registers 1344-1346 in a register section. One or more internal busses 1341 functionally interconnect these functional modules. The processor 1305 typically also has one or more interfaces 1342 for communicating with external devices via the system bus 1304, using a connection 1318. The memory 1334 is coupled to the bus 1304 using a connection 1319.

The application program 1333 includes a sequence of instructions 1331 that may include conditional branch and loop instructions. The program 1333 may also include data 1332 which is used in execution of the program 1333. The instructions 1331 and the data 1332 are stored in memory locations 1328, 1329, 1330 and 1335, 1336, 1337, respectively. Depending upon the relative size of the instructions 1331 and the memory locations 1328-1330, a particular instruction may be stored in a single memory location as depicted by the instruction shown in the memory location 1330. Alternately, an instruction may be segmented into a number of parts each of which is stored in a separate memory location, as depicted by the instruction segments shown in the memory locations 1328 and 1329.

In general, the processor 1305 is given a set of instructions which are executed therein. The processor 1105 waits for a subsequent input, to which the processor 1305 reacts to by executing another set of instructions. Each input may be provided from one or more of a number of sources, including data generated by one or more of the input devices 1302, 1303, data received from an external source across one of the networks 1320, 1302, data retrieved from one of the storage devices 1306, 1309 or data retrieved from a storage medium 1325 inserted into the corresponding reader 1312, all depicted in FIG. 13A. The execution of a set of the instructions may in some cases result in output of data. Execution may also involve storing data or variables to the memory 1334.

The disclosed arrangements use input variables 1354, which are stored in the memory 1334 in corresponding memory locations 1355, 1356, 1357. The arrangements produce output variables 1361, which are stored in the memory 1334 in corresponding memory locations 1362, 1363, 1364. Intermediate variables 1358 may be stored in memory locations 1359, 1360, 1366 and 1367.

Referring to the processor 1305 of FIG. 13B, the registers 1344, 1345, 1346, the arithmetic logic unit (ALU) 1340, and the control unit 1339 work together to perform sequences of micro-operations needed to perform "fetch, decode, and execute" cycles for every instruction in the instruction set making up the program 1333. Each fetch, decode, and execute cycle comprises:

(a) a fetch operation, which fetches or reads an instruction 1331 from a memory location 1328, 1329, 1330;

(b) a decode operation in which the control unit 1339 determines which instruction has been fetched; and (c) an execute operation in which the control unit 1339 and/or the ALU 1340 execute the instruction.

Thereafter, a further fetch, decode, and execute cycle for the next instruction may be executed. Similarly, a store cycle may be performed by which the control unit 1339 stores or writes a value to a memory location 1332.

Each step or sub-process in the processes of FIGS. 1 to 11, as well as FIG. 12, is associated with one or more segments of the program 1333 and is performed by the register section 1344, 1345, 1347, the ALU 1340, and the control unit 1339 in the processor 1305 working together to perform the fetch, decode, and execute cycles for every instruction in the instruction set for the noted segments of the program 1333.

The method of finding a region containing text in a colour bitmap image comprising a plurality of pixels may alternatively be implemented in dedicated hardware such as one or more integrated circuits performing the functions or sub functions of finding a region containing text in a colour bitmap image comprising a plurality of pixels. Such dedicated hardware may include graphic processors, digital signal processors, or one or more microprocessors and associated memories.

2. SYSTEM FOR FINDING TEXT REGIONS IN COLOUR BITMAP IMAGE

FIG. 1 depicts a system 100 for finding one or more text regions in a colour bitmap image of a colour document. The system 100 processes a bitmap image 111 of an input document using a scan processor 150 to produce an electronic document 190, for example containing text regions 192 ("ab") and 194 ("cd"). The electronic document 190 may be an image file, an editable document, a Portable Document Format (PDF, a proprietary format created by Adobe Systems Inc.) file, or a record stored in an electronic database, for example.

The input document image 111 can be provided by any of a variety of sources and is input to the scan processor 150. In one configuration of the system 100, a scanner 120 scans a hardcopy document 110 to produce the input document image 111. In another configuration of the system 100, the input document image 111 may be retrieved from a data storage system 130, such as a hard disk having a database of images stored on the hard disk. In another configuration of the system 100, the input document image 111 is produced by digital photography using a camera 140. The foregoing are merely examples of how an input document image 111, i.e. a colour bitmap image, might be provided. For another example, a software application might be used to generate the input document image 111 in PDF format.

In FIG. 1, the input document image 111 shows text characters 'a', 'b', 'c' and 'd' and small dots 112 spread throughout the input document image. These dots 112 are placed over the document image to encode information for a document security application. While the small dots 112 are used to encode information for the security application, the dots 112 can form visible noise for other applications. The dots 112 are comparable to the size of small text such as the dot on the letter "i". These small dots 112 spread throughout the document image 110 are referred to herein as "watermark noise". This watermark noise is introduced by a document security application, which may use the size, shape and/or location of the small dots 112 to encode information onto the document. A predominant characteristic of the watermark noise is that the noise is present throughout the page as opposed to non-watermark noise, which is an artefact present in local regions on the document image.

The scan processor 150 implements the process of finding the text regions in the colour bitmap image 111 of the colour document and comprises an optional preprocessing unit 160, a text region extraction module 170, and a memory 180. The scan processor 150 performs a combination of document analysis tasks on the input document image 111. The tasks include document preprocessing, colour quantisation, connected component (CC) analysis, tamper-proofing, visual quality enhancement, output compression, and OCR. The scan processor 150 includes a text-region extraction module 170 described hereinafter.

The memory 180 may be used to store data pertaining to scan processing tasks. In one configuration of the system 100, this memory 180 contains a document representation buffer 181 that stores the image that is being processed. The buffer 181 is used to store a "document image", with the document image being divided or partitioned along a regular grid into square, non-overlapping regions of the document image referred to as "tiles". The preferred tile size is 32×32 pixels at 300 DPI; however, other tile sizes and configurations may be practiced without departing from the scope of the invention. All threshold values mentioned hereinafter are based on this tile configuration for ease of reference only. The memory 180 may also contain:

- a CC classification table 182 that records the CC classification (e.g., text or noise) associated with each CC in the document image;
- geometric distribution statistics 183 for each tile of the document image;
- partitioned statistics bins 184 to store texture map profiling results;
- noise thresholds 185 used to characterise noise in the document image; and
- text region statistics 186.

The memory 180 of the scan processor 150 may be formed using one or more of Random Access Memory (RAM), Hard Disk Drive (HDD) memory, or other types of memory such as flash based memory for example.

The scan processor 150 initially stores the input document representation 111 in the document representation buffer 181. In one configuration of the system 100, the preprocessing unit 160 performs image processing tasks, such as colour quantisation, on the document image 111 and writes the resulting image back to the document representation buffer 181. Next, the text region extraction module 170 operates on the document image to find regions of text. In the process of finding the regions of text, the text region extraction module 170 writes to the geometric distribution statistics 183 for each tile and generates a CC classification table 182 that may be updated to record which CCs have been classified as noise CCs or text CCs. Connected-component classification is described in more detail hereinafter. If CCs are to be classified as noise CCs or text CCs, the text region extraction module 170 writes to the partitioned statistics bins 184 and the noise thresholds 185 to store intermediate results used in the classification process. Finally, the scan processor 150 produces an electronic document 190 using the text region statistics 186.

In various configurations of the system 100, the preprocessing unit 160 and the text region extraction module 170 are implemented, either separately or together, as application-specific integrated circuits (ASICs), on embedded processors, on general purpose computers, or using other such platforms. In one configuration of the system 100, a scanner 120 and a scan processor 150 containing an embodiment of the invention are integrated into a single device such as a multi-function printer (MFP). A local data store 130 within the MFP may be used to temporarily cache documents 110 that have been scanned by the scanner 120 but not yet processed by the scan processor 150. The format of the produced electronic document 190 may be chosen by the user operating the MFP, and the document analysis tasks performed by the scan processor 150 may be implied by the user's choice. One of these tasks may be text extraction, as performed by the text region extraction module 170.

3. METHOD OF EXTRACTING TEXT REGIONS

Figure 2:
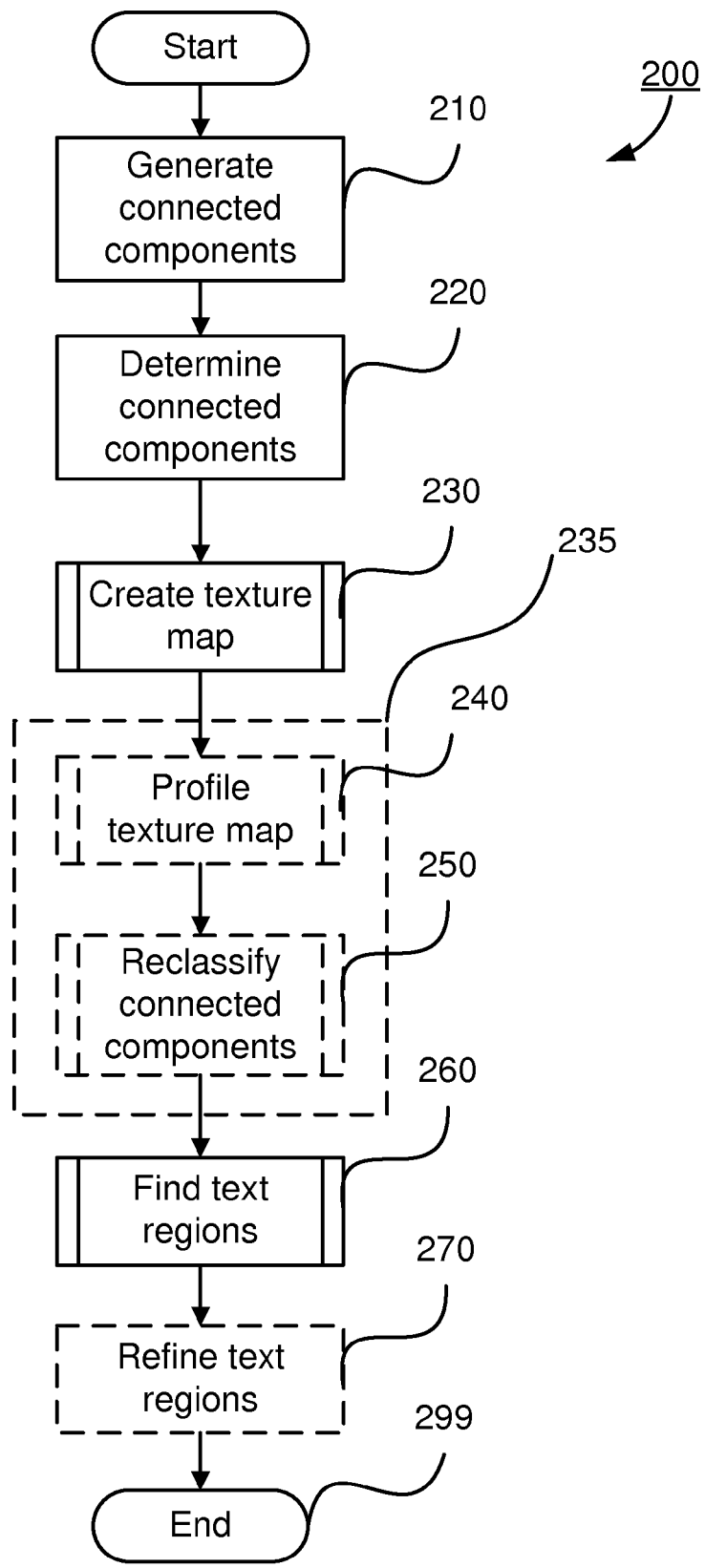
FIG. 2 is a schematic flow diagram illustrating a method of extracting text regions in a colour document image.

FIG. 2 illustrates a method 200 of extracting text regions, as can be implemented in the text-region extraction module 170 of the system 100. The method 200 has an initial CC generating step 210, a CC determining step 220, a texture-map creating process 230, an optional text CC refining process 235, a text region finding process 260, and an optional text-region refining step 270. The optional steps 235, including sub-steps 240 and 250, and 270 are indicated by dashed lines. The optional text CC refining step process comprises a texture-map profiling process 240 and a CC reclassifying process 250. The method 200 ends in step 299.

The CC generating step 210 processes pixels of the document image in a raster scan order and connects adjacent pixels that meet a connectedness criterion as described hereinafter. In an embodiment of the invention, the CC generating step 210 operates on a colour-quantised document image as provided by the preprocessing unit 160 of FIG. 1, and the CC generating step 210 connects adjacent pixels with the connectedness criterion being that the pixels share the same quantised colour. In another embodiment of the invention, the document image is not preprocessed by the preprocessing unit 160, and the CC generating step 210 connects adjacent pixels with the connectedness criterion being that pixels are substantially similar in colour. Two colours are substantially similar if their colour difference is relatively small compared to the colour difference between a foreground object and a background object. In the first embodiment, substantially similar in colour can be determined by setting an upper limit on the number of quantised colours for colour quantisation. In setting the number limit for quantised colours, pixels with substantially similar colours are quantised to the same colour. In the second embodiment, substantially similar in colour can be determined by checking whether the difference between two colours is within a predefined colour difference threshold. Thus, the connected components are generated from the colour bitmap image by grouping substantially similarly coloured and adjacent pixels. In this manner, CCs are formed.

The text CC determining step 220 determines, independently of colour, which of the connected components are text connected components dependent upon attributes of the connected components described hereinafter. More particularly, this step 220 classifies the CCs by assigning a class (e.g., text or non-text) to each of the CCs formed by the CC generating step 210. The class indicates whether a CC has text characteristics. In an embodiment of the invention, the CC determining or classifying step 220 analyses CCs based on statistical measures independent of the CC's colour, relating to those CCs, and assigns each CC a class based on those statistical measures using existing techniques. The statistical measures used may be the attributes of the CC, such as the number of pixels that make up the CC, the height and the width of a bounding box of the CC, and the fill ratio of the bounding box of the CC. The bounding box of a CC is the minimum rectangle that completely encloses the CC. The fill ratio is the ratio of the number of pixels belonging to the CC in the bounding box to the total number of pixels in the bounding box. A classifier can be trained to classify the CCs based on the statistical measures into text CCs or non-text CCs. The classification assigned to each CC is stored in the CC classification table 182 in the memory 180 of FIG. 1. Connected components (CCs) assigned the text classification are referred to herein as "text CCs". Due to the statistical similarities between unwanted marks and small text CCs, unwanted marks will likely be classified as text during the CC classifying step 220. Therefore, a text CC refining step 235 may optionally be carried out with a better context after all the CCs on the page are analysed.

The texture-map creating process 230 gathers geometric distribution statistics pertaining to regions of the colour bitmap image based on the presence of text CCs in those regions. This step 230 divides the bitmap image into tiles, each comprising a number of pixels arranged contiguously. For example, the tile may be 32×32 pixels in size and configuration, but other tile sizes and configurations may be practiced. Alternatively, the colour bitmap image may be a tile initially. The texture-map creating process 230 determines the tiles overlapped by at least a portion of a text CC and distributes relevant statistics into each of those overlapped tiles. The resultant statistics in each tile are stored as the tile geometric distribution statistics 183 of FIG. 1, and the overall collection of geometric distribution statistics for all the tiles is referred to as the "texture map". The texture-map creating process 230 according to an embodiment of the invention is described in more detail hereinafter in section 4 ("Texture-Map Creating Process").

The text CC refining step 235 reclassifies CCs dependent upon noise characteristics determined from the texture map. The texture-map profiling process 240, which is part of the optional text CC refining module 235, profiles the texture map produced by the texture map creating process 230 to identify noisy regions and characterise the noise in those regions with text CCs. The texture map can be profiled by analysing one of the geometric distribution statistics 183 contained within tiles, and thereafter determining whether a dominant noise type is either watermark noise or non-watermark noise. The characteristics of watermark noise and non-watermark noise are quite different. Therefore, different methods are used to identify noisy tiles and to characterise noise based on the dominant type of noise as determined from the texture map. The texture map profiling process 240 according to an embodiment of the invention is described in more detail hereinafter in section 5 ("Texture-Map Profiling Process").

The CC reclassifying process 250, which is also part of the optional text CC refining module 235, checks text CCs against the noise characteristics determined by the texture-map profiling step 240 and reclassifies the text CCs as noise if the text CCs match the noise characteristics. The reclassification is performed by updating the CC classification table 182 of FIG. 1. The CC reclassifying process 250 is described in more detail in section 6 ("Reclassifying Connected Components Process").

Figure 3:
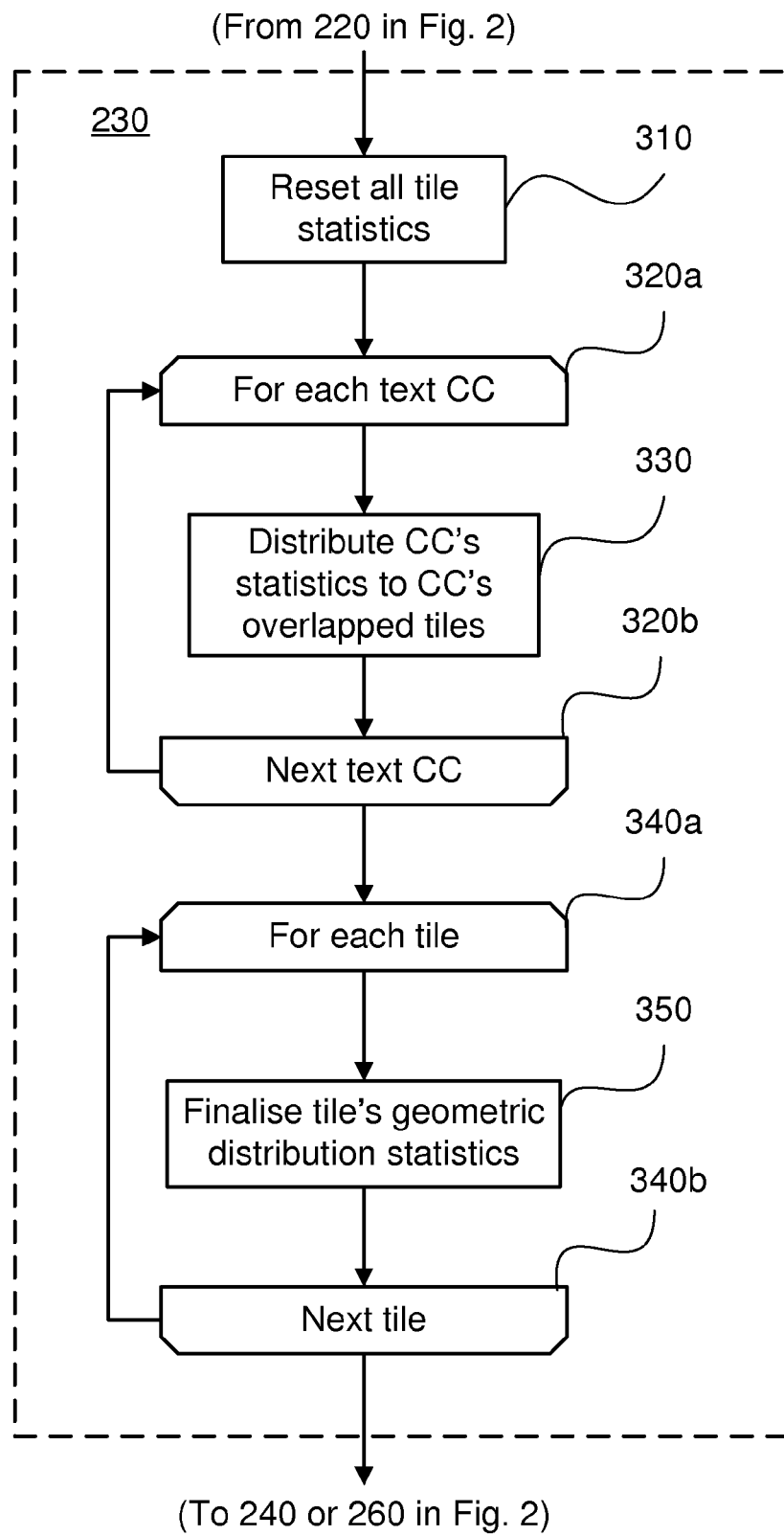
FIG. 3 is a schematic flow diagram illustrating a method of creating a texture map as used in the method of FIG. 2.

The text region finding process 260 uses the texture-map creating process 230 of FIG. 3 to extract text regions from the colour bitmap image. In cases where the optional text CC refining module 235 is used to distinguish text from noise, the text-regions finding process 260 updates the texture map, produced by the texture-map creating step 230, to reflect the changes after the reclassifying step 250. The text-region finding step 260 is described in more detail hereinafter in section 7 ("Finding Text Regions Process").

An optional text region refining step 270 that refines the one or more text regions can be used after the text region finding process 260. The refining step 270 examines each of the one or more text regions found by step 260 and makes a decision whether to combine the current text region with other text regions. This decision to combine may be based on the size of the text region. For example, small text regions having an area less than an area threshold, $T_{TileArea}$, can be merged with adjacent larger text region. A suitable threshold for $T_{TileArea}$ that may be practiced is 4 tiles. Alternatively, the decision to merge can also be based on the difference between the average tile pixel densities of two adjacent text regions. The average tile pixel density of a text region is the sum of the pixel densities of all the tiles that make up the text region divided by the number of tiles in the text region. A text pixel density of a tile is a ratio of the total number of text pixels to the total pixels in the tile. A text region is said to be adjacent to another text region if at least one tile in one of the text region abuts one or more tiles in the other text region.

The method 200 of finding text regions in a colour bitmap image of a document ends in step 299.

4. TEXTURE-MAP CREATING PROCESS

FIG. 3 illustrates in detail the create texture map process 230 of FIG. 2. The process 230 comprises a tile statistic resetting step 310, a text CC statistic distribution step 330 within a text CC loop 320, and a tile statistic finalisation step 350 within a tile loop 340. The tile statistic resetting step 310 initialises the geometric distribution statistics 183 in each tile. The tile statistic resetting step 310 can comprise allocating memory, if not yet allocated, for the geometric distribution statistics in each tile, and setting these statistics to initial values. In an embodiment of the invention, the geometric distribution statistics in each tile are:

the number of text CCs in the tile, $TILE_{Txt\_CCs\_Count}$;

the number of pixels belonging to text CCs in the tile, $TILE_{Txt\_Pixel\_Count}$;

the minimum number of pixels belonging to a text CC in the tile, $TILE_{Min\_Pix}$;

the maximum number of pixels belonging to a text CC in the tile, $TILE_{Max\_Pix}$;

the average number of text pixels per text CC in the tile, $TILE_{Avg\_Pix\_Cnt}$; and the fraction of pixels in the tile that belong to text CCs, $TILE_{Text\_Pixel\_Density}$.

The text CC (for-next) loop 320 iterates over all text CCs formed from the document image. During each iteration of the text CC loop 320a and 320b, the text CC statistic distributing step 330 is performed using the current text CC. The text CC statistic distributing step 330 can gather statistical measures pertaining to the current text CC and distribute these statistical measures evenly into the geometric distribution statistics 183 of each of the tiles that are overlapped by the current text CC. For each text CC, fetched by iterator 320, the statistic distributing step 330 gathers the following statistics:

the number of pixels in the text CC, $CC_{Txt\_Pixel\_Count}$;

the number of tiles the CC overlaps, $Tile_{Cnt\_Overlap}$;

the number of pixels per overlapped tile, $CC_{Pix\_Per\_Tile} = CC_{Txt\_Pixel\_Count}/Tile_{Cnt\_Overlap}$; and the fraction of text CC per overlapped tile, $CC_{Cnt\_Per\_Tile} = 1/Tile_{Cnt\_Overlap}$.

Alternatively the value for $CC_{Pix\_Per\_Tile}$ can be set to a predetermined value that is independent of the number of pixels, such as assigning a value of one.

For each of the tiles that the CC overlaps, the statistic distributing step 330 calculates the following statistics:

$TILE_{Txt\_CCs\_Count}$ is incremented by $CC_{Cnt\_Per\_Tile}$;

$TILE_{Txt\_Pixel\_Count}$ is incremented by $CC_{Pix\_Per\_Tile}$;

$TILE_{Min\_Pix}$ is replaced by $CC_{Pix\_Per\_Tile}$ if $CC_{Pix\_Per\_Tile}$ is smaller; and $TILE_{Max\_Pix}$ is replaced by $CC_{Pix\_Per\_Tile}$ if $CC_{Pix\_Per\_Tile}$ is larger;

The tile (for-next) loop 340 iterates over all tiles in the document image. During each iteration of the tile loop (340a and 340b), the tile statistic finalising step 350 is performed using the current tile of the iteration to calculate $TILE_{Avg\_Pix\_Cnt}$ and $TILE_{Text\_Pixel\_Density}$ by the following equations:

$TILE_{Avg\_Pix\_Cnt} = TILE_{Txt\_Pixel\_Count}/TILE_{Txt\_CCs\_Count}$;

$TILE_{Text\_Pixel\_Density} = TILE_{Txt\_Pixel\_Count}/$total number of pixels per tile.

The fraction of pixels in the tile that belong to text CCs, $TILE_{Text\_Pixel\_Density}$, is referred to as the "tile pixel density" or "tile text pixel density". The average of the text pixel density of one or more tiles is referred to as the "average tile text pixel density" or "average tile pixel density".

Figure 4A:
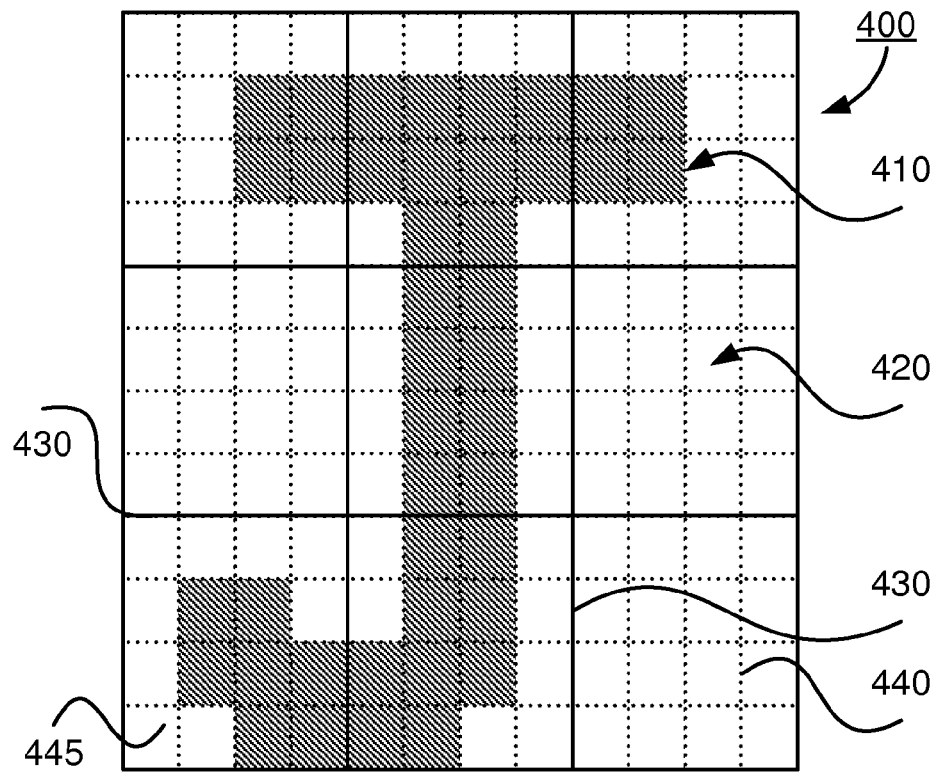
FIG. 4A is an example of a text CC that overlaps multiple tiles.
Figure 4B:
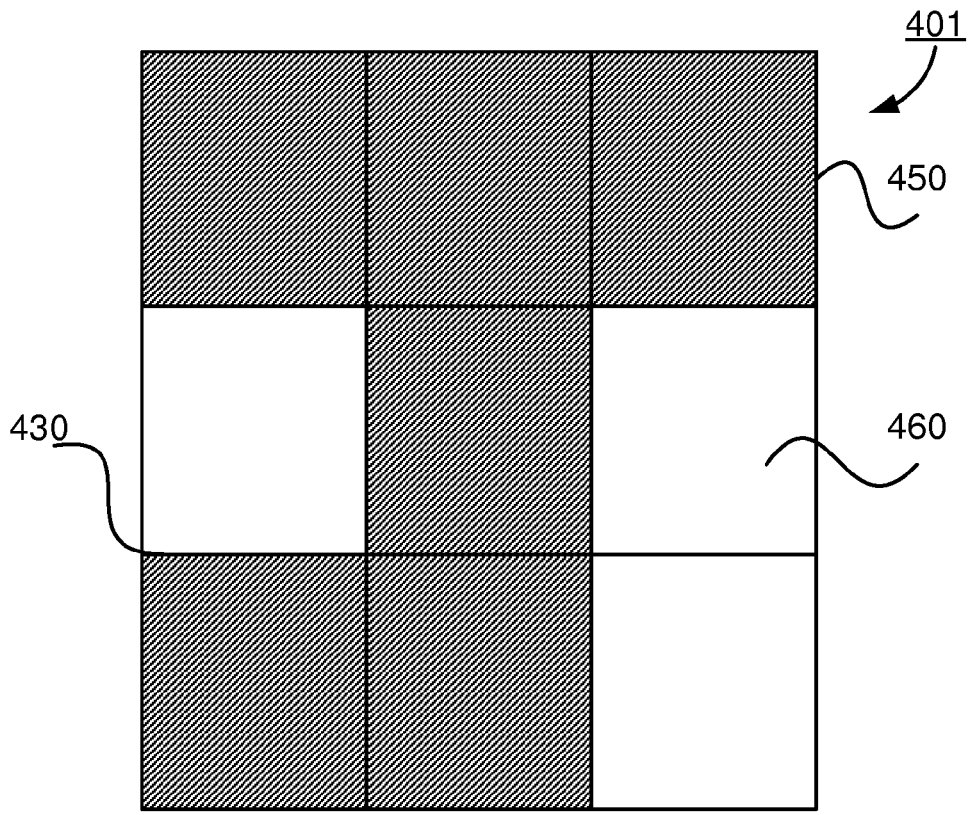
FIG. 4B is an example of the overlapped tiles for the example given in FIG. 4A.

FIG. 4A and FIG. 4B, when considered together, provide an example of the determination of a text CC's overlapped tiles. FIG. 4A shows an example 400 of a text CC 410 (hatched) positioned on a background CC 420 (unhatched). Tile boundaries are indicated by thick lines 430, and pixel boundaries are indicated by dotted lines 440. Referring to the example of FIG. 4A, there are therefore nine tiles, each comprising sixteen pixels. This number of pixels per tile is chosen for ease of illustration only. In an actual implementation, each tile may contain 1024 pixels. FIG. 4B shows an example 401 of the tiles overlapped by the text CC 410 of FIG. 4A. The tile boundaries 430 in example 401 correspond to the tile boundaries 430 of example 400. The overlapped tiles 450 (hatched) of the text CC 410 are the same tiles that contain at least one pixel of that text CC 410. The non-overlapped tiles 460 (unhatched) of the text CC 410 are exactly the tiles that contain no pixels of that text CC. One tile 445 in the FIG. 4A is used to illustrate the create texture map process 230. The iterator 320 of FIG. 3 fetches the CC 410 and the CC statistic distributing step 330 calculates the following CC statistics for 410:

$CC_{Txt\_Pixel\_Count} = 42$ pixels (from FIG. 4A);

$Tile_{Cnt\_Overlap} = 6$ tiles (from FIG. 4B); and $CC_{Pix\_Per\_Tile} = CC_{Txt\_Pixel\_Count}/Tile_{Cnt\_Overlap} = 7$.

The CC statistic distributing step 330 distributes the statistics of the text CC 410 to the tile 445 as follows:

$TILE_{Txt\_CCs\_Count} = 1/6$;

$TILE_{Txt\_Pixel\_Count} = 7$;

$TILE_{Min\_Pix} = 7$; and $TILE_{Max\_Pix} = 7$.

The tile statistic finalising step 350 calculates the final statistics for the tile 445 as follows:

$TILE_{Avg\_Cnt\_From\_CCs}=7$ (since only one CC overlaps the tile); and $TILE_{Text\_Pixel\_Density}=TILE_{Txt\_Pixel\_Count}$/Total Pixels in the tile=7/16=0.4375.

5. OPTIONAL TEXTURE-MAP PROFILING PROCESS

Figure 5:
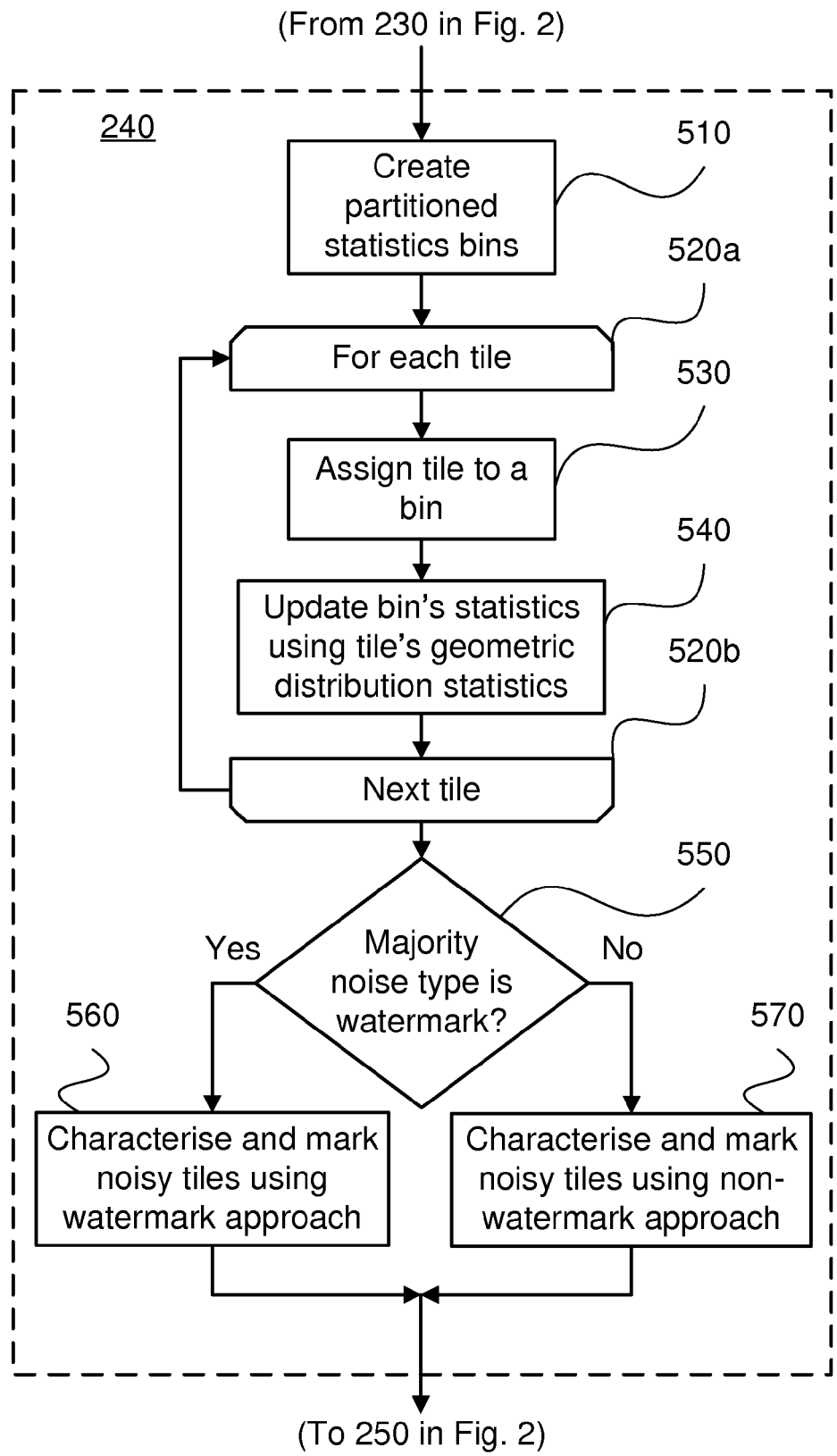
FIG. 5 is a schematic flow diagram illustrating a method of profiling a texture map as used in the method of FIG. 2.

FIG. 5 illustrates a process of profiling a text CC texture map, as may be used in the texture map profiling process 240 of FIG. 2. The process comprises a partitioned statistics bins creating step 510, a tile (for-next) loop 520 containing both a tile-to-bin assigning step 530 and a bin statistics updating step 540, a majority noise type test 550, a watermark-based noisy tile marking step 560, and a non-watermark-based noisy tile marking step 570.

The partitioned statistics bins creating step 510 creates and initialises statistics bins. This may comprise allocating memory, if not yet allocated, for a plurality of statistics bins 184, and resetting the values of the statistics in these bins. The bins are partitioned to aggregate the geometric distribution statistics 183 into a few characteristic groups based on the statistic of average text pixels per text CC, $TILE_{Avg\_Pix\_Cnt}$, in a tile. At least one bin aggregates statistics from tiles with a noise-like characteristic. The bin aggregating statistics from tiles with a noise-like characteristic can be designated to include statistics from tiles having average text pixels per text CC, $TILE_{Avg\_Pix\_Cnt}$, in a tile statistics is less than 10 pixels when the tile size is 32×32 pixels at 300 DPI. Other bins are partitioned to each aggregate tiles that contain text CCs of similar sizes. The partitioned statistics bins creating step 510 may also allocate memory, if not yet allocated, to store noise thresholds 185 that characterise noise in the colour bitmap image of the document. The tile (for-next) loop 520 iterates over all tiles in the colour bitmap image of the document. During each iteration (520a, 520b) of the tile loop 520, the tile-to-bin assigning step 530 and the bin statistics updating step 540 are performed using the current tile of the iteration. The steps in this tile loop 520 form a histogram by including the geometric distribution statistics 183 of each tile in the appropriate partitioned statistics bin 184. The tile-to-bin assigning step 530 assigns the current tile to one of the partitioned statistics bins 184 according to the partitioning of the bins as determined by the partitioned statistics bins creating step 510. The tile-to-bin assignment step 530 can retrieve the current tile's geometric distribution statistic of the average text pixels per text CC in the tile, and thereafter finds the appropriate statistics bin according to the partitioning of the bins performed by the partitioned statistics bins creating step 510.

The bin statistics updating step 540 updates the statistics contained in the bin that was associated with the current tile during the tile-to-bin assignment step 530. This step updates the associated statistics bin to include the geometric distribution statistics 183 of the current tile. A tile is said to be included in a statistics bin if that tile's geometric distribution statistics have been used to update the statistics in that statistics bin. The bin statistics of the assigned bin that are updated for the current tile can comprise:

the maximum value of the text pixel count per text CC, $TILE_{Avg\_Pix\_Cnt}$, statistic of all of the included tiles of the assigned bin;

the count of tiles included into the assigned bin (the included tile count);

the mean of the text pixel count per text CC, $TILE_{Avg\_Pix\_Cnt}$, statistic across all included tiles of the assigned bin;

the standard deviation of the text pixel count per text CC, $TILE_{Avg\_Pix\_Cnt}$, statistic across all included tiles of the assigned bin;

the mean of the text CC count, $TILE_{Txt\_CCs\_Count}$, statistic across all included tiles of the assigned bin; and the standard deviation of the text CC count, $TILE_{Txt\_CCs\_Count}$, statistic across all included tiles of the assigned bin.

The majority noise type test step 550 uses the partitioned statistics produced in the tile loop 520 (including steps 530 and 540) to determine if the majority noise type is watermark. This step 550 characterises the noise in the image as being either primarily watermark noise or non-watermark noise. The noise type can be characterised by checking which of the statistics bins 184 produced in the tile loop 520 contains the most included tiles. If the statistics bin with the greatest included tile count is the bin designated for statistics from tiles with a noise-like characteristic (Yes), the dominant noise type is found to be watermark noise; otherwise (No), the dominant noise type is found to be non-watermark noise. If the majority noise type is found to be watermark noise (Yes), the watermark-based noisy tile marking step 560 is performed; otherwise (No), the non-watermark-based noisy tile marking step 570 is performed.

The watermark-based noisy tile marking step 560 characterises and marks tiles as noisy depending on the values of each tile's geometric distribution statistics 183 and values of the statistics in the partitioned statistics bins 184. This step 560 determines a first text pixel per text CC, $TILE_{Avg\_Pix\_Cnt}$, threshold and a first text CC, $TILE_{Txt\_CCs\_Count}$, threshold, both of which are calculated using the means and standard deviations in the noise-like statistics bin, say using the mean of the statistic added to one standard deviation of that statistic. For example, the first text CC threshold could be the mean of the text CC count across all tiles included in the noise-like statistics bin added to one standard deviation of the text CC count statistic across all included tiles of the noise-like statistics bin. Tiles with geometric distribution statistics 183 that satisfy both the first determined thresholds are marked as noisy tiles in their respective geometric distribution statistics. Thereafter, tiles neighbouring noisy tiles are retested against a second text pixel per text CC threshold and a second text CC threshold. The second thresholds are relaxed relative to the first of the thresholds, say using the mean of a statistic added to three standard deviations of that statistic. For example, the second text CC threshold may be the mean of the text CC count statistic across all included tiles of the noise-like statistics bin added to three standard deviations of the text CC count statistic across all included tiles of the noise-like statistics bin. If such tiles have geometric distribution statistics that satisfy the second thresholds, those tiles are marked as noisy tiles in their respective geometric distribution statistics 183. The first and second text pixel per text CC thresholds are stored as noise thresholds (referred to as $T_{pixperc c1}$ and $T_{pixperc c2}$ respectively) 185 for the identification of noise CCs in the later adaptive CC size threshold test 630 and a noisy tile surroundings test 660, both described in more detail hereinafter.

The non-watermark-based noisy tile marking step 570 characterises and marks noisy tiles using a non-watermark approach. This step 570 applies two tests to each tile to determine whether the tile is noisy. First, each tile is tested for whether the tile contains a dense cluster of small text CCs, by comparing that tile's geometric distribution statistics 183 against a first set of predefined thresholds. The statistics tested are the number of text pixels per text CC in the tile and the number of text CCs in the tile, which in this implementation is 20 pixels, at 30 DPI, per text CC and 10 text CCs respectively. If the first set of thresholds is satisfied, the tested tile is marked as a noisy tile in its geometric distribution statistics 183; otherwise, the tile is further tested for whether the tile contains a sparse cluster of very small text CCs, by testing the same geometric distribution statistics against a second set of predefined thresholds, which in this implementation is 4 pixels per text CC and 3 text CCs in the tile. The second set of thresholds is, relative to the first set, more relaxed on number of text CCs in the tile but is more strict on the number of text pixels per text CC in the tile. If the second set of thresholds is satisfied, the tested tile is marked as a noisy tile in its geometric distribution statistics 183.

From step 560, processing continues at step 250 of FIG. 2. Likewise, from step 570, processing continues at step 250 of FIG. 2.

6. RECLASSIFYING CONNECTED COMPONENTS PROCESS

Figure 6:
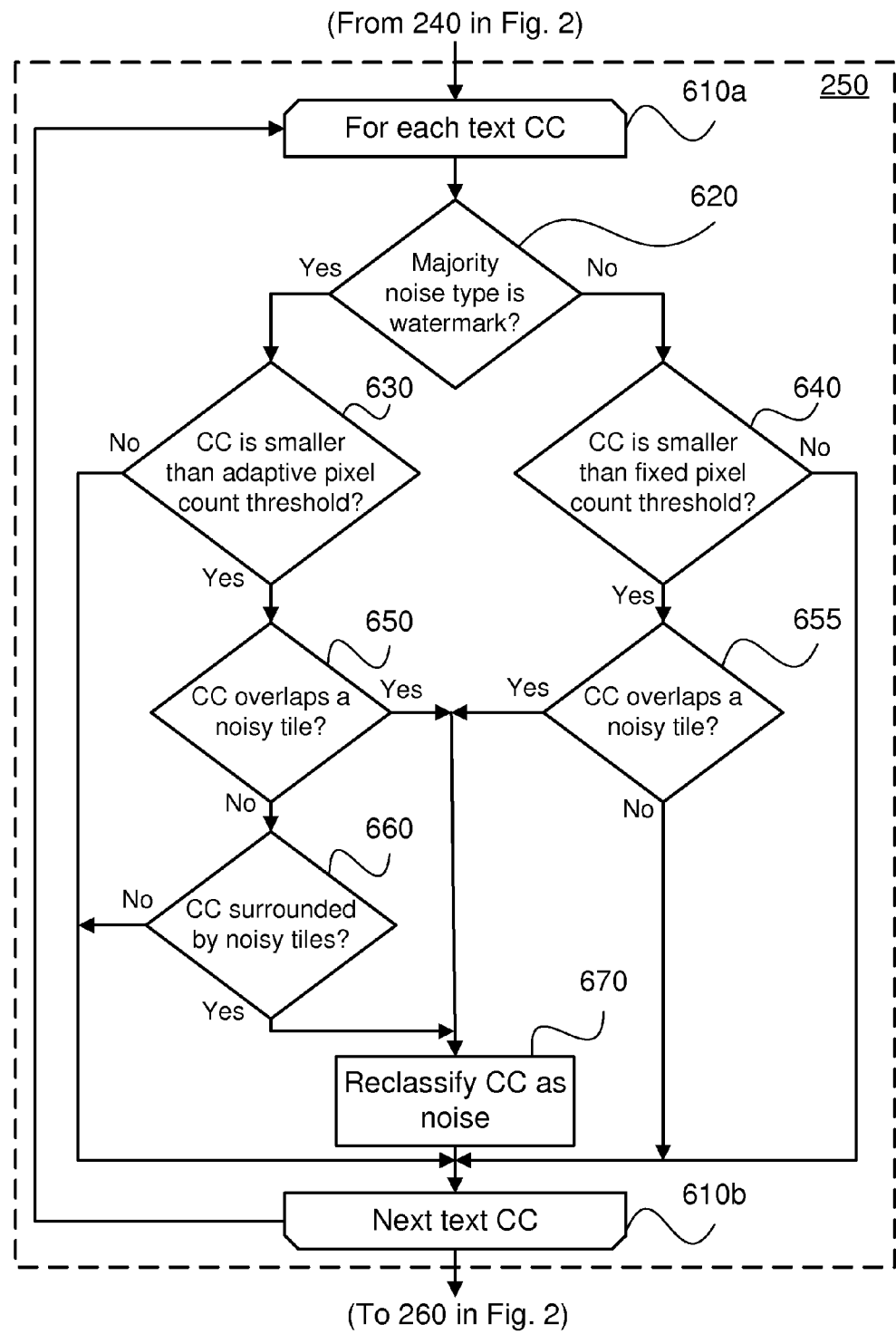
FIG. 6 is a schematic flow diagram illustrating a method of reclassifying CCs as used in the method of FIG. 2.

FIG. 6 illustrates a method of reclassifying CCs, as may be used for the CC reclassification process 250 of FIG. 2. The method comprises a text CC (for-next) loop 610 (610*a*, 610*b*) containing a branching sequence of tests 620, 630, 640, 650, 655 and 660 that may lead to executing a text-to-noise reclassification step 670 (also within the text CC loop). Specifically, the tests mentioned are a majority noise type test 620, an adaptive CC size threshold test 630, a fixed CC size threshold test 640, a first noisy tile overlapping test 650, a second noisy tile overlapping test 655, and a noisy tile surroundings test 660.

Referring to FIG. 6, there are two independent subsequences of tests (illustrated in a left column 630, 650, 660 and a right column 640, 655), preceded by the majority noise type test 620. The result of the majority noise type test 620 determines which of the two independent subsequences of tests is executed.

From step 240 in FIG. 2, processing continues at step 610*a*. The text CC (for-next) loop 610 iterates over all text CCs formed from the document image. During each iteration of the text CC loop 610 (610*a*, 610*b*), the branching sequence of tests 620, 630, 640, 650, 655 and 660 is performed using the current text CC of the iteration, and the text-to-noise reclassification step 670 may also be performed using the current text CC.

The majority noise type test step 620 determines whether the dominant noise type is watermark noise (or non-watermark noise). The majority noise type test may reuse the result determined during the majority noise type test 550. The majority noise type test may be applied to the entire page/image.

If the majority noise type test 620 determines that the dominant noise type is watermark noise (Yes), the leftmost subsequence (as illustrated in FIG. 6) is executed. The first test in this subsequence is the adaptive CC size threshold test step 630. The adaptive CC size threshold test 630 determines if the CC is smaller than the adaptive pixel count threshold. The size (in terms of the pixel count) of the current text CC is compared against a threshold determined based on the profiling of the texture map that occurred during the texture map profiling process 240 of FIG. 2. The second noise threshold $T_{pixpercc2}$, may be stored into noise thresholds 185 of memory 180 by the watermark-based noisy tile marking step 560. If the current text CC is larger than the determined threshold (No in step 630), the current CC is not reclassified and the next iteration of the text CC loop 610 begins (via 610*b* to step 610*a*); otherwise (Yes), the second test in the leftmost subsequence, the first noisy tile overlapping test 650, is evaluated.

The second test in the leftmost subsequence (as illustrated in FIG. 6) is the first noisy tile overlapping test step 650. This step 650 determines if the CC overlaps a noise tile. First, this test 650 determines the bounding box of the current text CC, which is the rectangle with minimal area that is parallel to the horizontal and vertical edges of the document image and either overlaps or encloses all of the pixels of the current text CC. Next, this test 650 determines if any of the overlapped tiles of the current text CC's bounding box is marked as being a noisy tile. The same overlapped tiles determination method may be used as was used in the text CC statistic distribution step 330 of FIG. 3. If one or more overlapping noisy tiles is found (Yes), the text-to-noise reclassification step 670 is performed and the next iteration of the text CC loop 610 begins; otherwise (No), the third test in the leftmost subsequence, the noisy tile surroundings test 660, is evaluated.

The third test in the leftmost subsequence (as illustrated in FIG. 6) is the noisy tile surroundings test 660. Step 660 determines whether or not the current CC is surrounded by noisy tiles. First, this test 660 determines the bounding box of the current text CC. Next, this test 660 expands the bounding box in each direction (upwards, downwards, leftwards and rightwards) by one tile. Thereafter, this test 660 determines how many overlapped tiles of the current text CC's expanded bounding box are marked as being noisy tiles. If the number of such noisy tiles is above a surrounding noisy tiles threshold, say three, then the current text CC's pixel count is compared to the first noise threshold $T_{pixpercc1}$ stored in 185 by the watermark-based noisy tile marking step 560. If the current text CC is smaller than this threshold (Yes), the text-to-noise reclassifying step 670 is performed and the next iteration of the text CC loop 610 begins; otherwise (No—CC is not surrounded by noisy tiles), the current text CC is not reclassified, processing continues at step 610*b*, and the next iteration of the text CC loop 610 begins. The same overlapped tiles determination method is used as was used in the text CC statistic distribution step 330 of FIG. 3. Thus, the leftmost subsequence, as illustrated in FIG. 6, has been described.

If the majority noise type test step 620 instead determines that the dominant noise type is non-watermark noise (No), the rightmost subsequence (as illustrated in FIG. 6) is executed. The first test in this subsequence is the fixed CC size threshold test step 640. Step 640 determines if the current CC is smaller than the fixed pixel count threshold. The fixed CC size threshold test 640 compares the size (in terms of the pixel count) of the current text CC against a fixed threshold, e.g., 20 pixels. If the current text CC is larger than this threshold (No), the current text CC is not reclassified, processing continues at step 610*b*, and the next iteration of the text CC loop 610 begins; otherwise (Yes), the second test in the rightmost subsequence, the second noisy tile overlapping test 655, is evaluated.

The second test in the rightmost subsequence (as illustrated in FIG. 6) is the second noisy tile overlapping test step 655. Step 655 checks to determine if the current CC overlaps a noisy tile. First, this test 655 determines the bounding box of the current text CC, which is the rectangle with minimal area that is aligned to the document image's axes and either overlaps or encloses all of the pixels of the current text CC. Next, this test 655 determines if any of the overlapped tiles of the current text CC's bounding box is marked as being a noisy tile. The same overlapped tiles determination method from the text CC statistic distribution step 330 may be used. If one or more overlapping noisy tiles is found (Yes), the text-to-noise reclassification step 670 is performed and the next iteration of the text CC loop 610 begins; otherwise (No), the current text CC is not reclassified, processing continues at step 610b, and the next iteration of the text CC loop 610 begins. Thus, the rightmost subsequence, as illustrated in FIG. 6, has been described.

The text-to-noise reclassification step 670 changes the classification of the current text CC to noise by modifying the value associated with the CC in the CC classification table 182. Once the text CC for-next loop 610a, 610b completes (i.e. there are no remaining text CCs to process), processing continues at step 260 of FIG. 2.

7. FINDING TEXT REGIONS PROCESS

Figure 7:
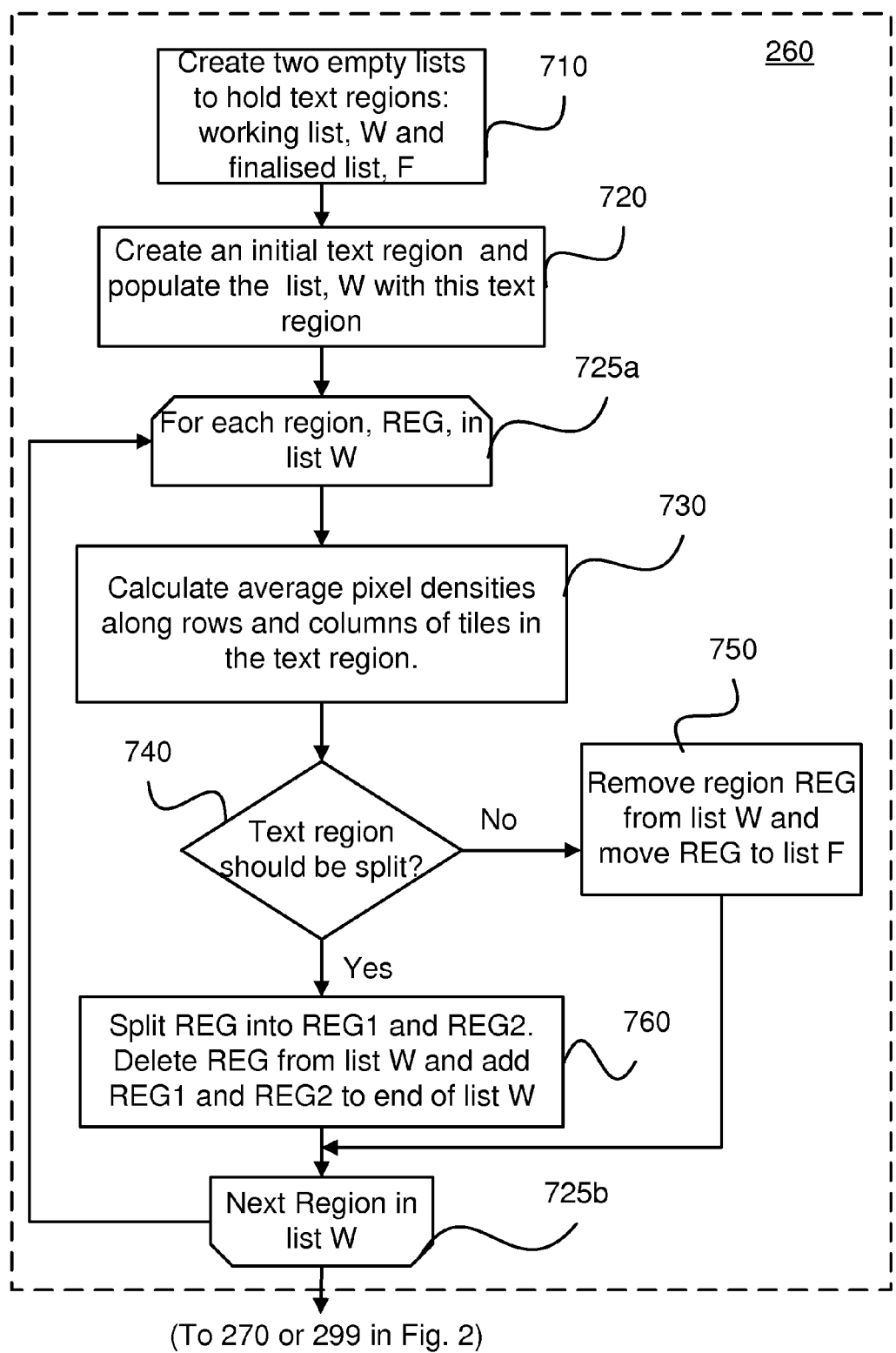
FIG. 7 is a schematic flow diagram illustrating a method of finding text regions as used in the method of FIG. 2.

FIG. 7 is a schematic flow diagram illustrating a process 260 of finding text regions according to one implementation of the invention, such as could be implemented in the text region extracting module 170 of the system 100. In the case where the optional text CC refining module 235 is used, the find text regions process 260 updates the tile pixel density for all the tiles, as calculated by the create texture map process 230, to account for the changes from the CC reclassification process 250. The find text regions process 260 analyses the tile pixel density statistics stored in memory 183 to find a list of regions containing text. Each text region is allocated storage in memory for storing text region statistics 186 which include:

- a list of the text tiles that make up the region;
- the average text pixel density of all the tiles in the region; and
- the bounding box co-ordinates of the text region.

Referring to FIG. 7, the process 260 starts with the list creating step 710 creating two empty lists to hold text regions: a working list, W, to hold text regions temporarily; and a finalised list, F, to hold the final list of text regions. Initially, both the lists are empty.

The initial text region creating step 720 creates an initial text region and populates the list W with this text region. The step 720 groups all the tiles in the document image into a single text region, which represents the whole page and uses this text region to populate the working list W. Next, a splitting algorithm based on the average tile pixel density is used to split the initial text region into coherent text regions in steps 725, 730, 740, 750, and 760. Each region, REG, in the working list W is fetched one at a time by an iterator 725 (725a, 725b) for splitting consideration. The average tile pixel density for each region REG is calculated along each row and column in the text region REG by a pixel density calculating step 730. Subsequently, a splitting decision is made by a split decision test step 740. In step 740, a check is made to determine if the text region should be split dependent upon whether the ratio between the minimum and the maximum average pixel density along rows or columns of tiles is below a predefined threshold. This is explained by example in FIG. 8 described hereinafter. If the split decision test 740 decides that the region REG is to be split (Yes), then the region splitting step 760 splits the region REG into two text regions, REG1 and REG2. The region splitting step 760 adds REG1 and REG2 to the end of the working list W and deletes the region REG from the working list W. The region splitting step 760, by adding REG1 and REG2 to the end of the working list W, ensures that the newly formed regions, REG1 and REG2, are considered for splitting by the iterator 725 in later iterations. Processing continues at step 725b. If a decision is made not to split the text (No) in step 740, the region REG is considered final, removed from the working list W, and moved to the finalised list F by the region finalisation step 750. Processing continues at step 725b. This process in the REG for-next loop 725a, 725b continues until there are no more regions in the working list, W. From step 725b once there are no more regions in the list W, processing continues at step 270 or 299 in FIG. 2.

Figure 8A:
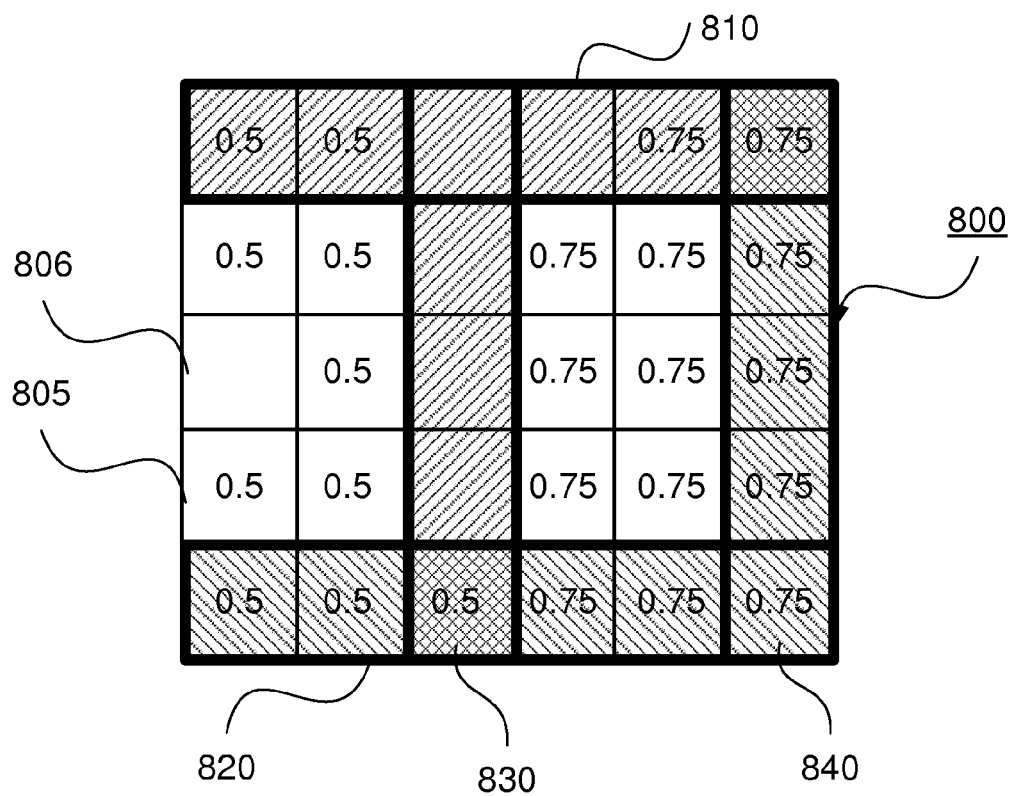
FIG. 8A is an example of a text region under consideration for splitting.
Figure 8B:
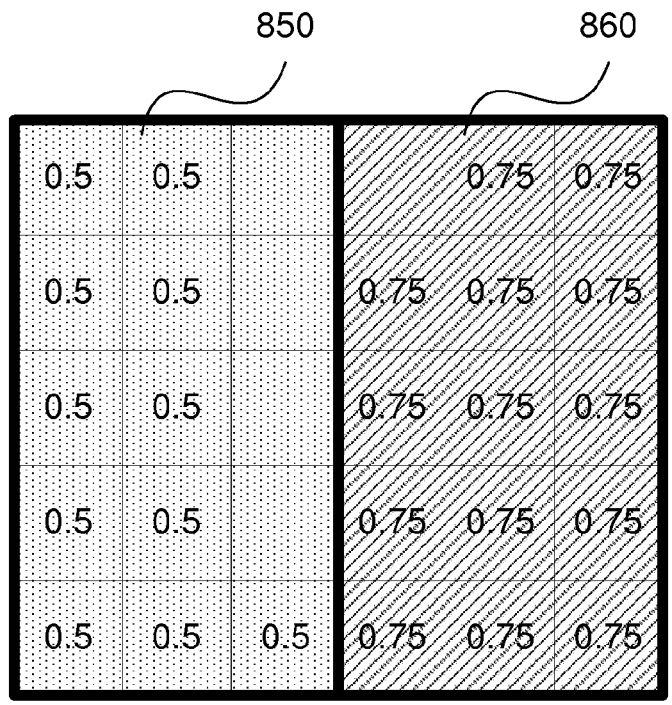
FIG. 8B is an example of the text region shown in FIG. 8A after the text region is split into two.

FIG. 8A and FIG. 8B illustrate how a text region splitting decision is made by the split decision test 740, using calculations from the pixel density calculating step 730. FIG. 8A shows a text region 800 comprising tiles arranged in five rows and six columns One tile 805 in the text region 800 encloses the number 0.5 in the tile, which is the tile text pixel density. Tile 806, which is empty, is also a tile in the text region 800, but with a text pixel density of 0. The pixel density calculating step 730 calculates the average tile pixel density for each row and column in the text region 800. Furthermore, the pixel density calculating step 730 identifies the row with the minimum average tile pixel density, $TPD_{RowMin}$, and the row with the maximum average tile pixel density, $TPD_{RowMax}$. The pixel density calculating step 730 also identifies the column with minimum average tile pixel density, $TPD_{ColMin}$, and the column with the maximum average tile pixel density, $TPD_{ColMax}$.

The row 810 of tiles (0.5, 0.5, 0, 0, 0.75, 0.75), spanning from the top left to the top right in the text region 800, has the minimum average tile text pixel density, $TPD_{RowMin}$. The row 820 of tiles (0.5, 0.5, 0.5, 0.75, 0.75, 0.75), spanning from the bottom left to the bottom right in text region 800, has the maximum average tile pixel density, $TPD_{RowMax}$. The column 830 of tiles, spanning from the top to the bottom of the third column in text region 800, has the minimum average tile pixel density, $TPD_{ColMin}$. The column 840 of tiles, spanning from top to bottom of the sixth column in text region 800, with maximum average tile pixel density, $TPD_{ColMax}$. The split decision test step 740 decides to split a text region as explained hereinafter:

The split decision test 740 uses the calculations from the pixel density calculating step 730 to find:

$TPD_{ColRatio} = TPD_{ColMin} / TPD_{ColMax}$; and
$TPD_{RowRatio} = TPD_{RowMin} / TPD_{RowMax}$.

If $TPD_{ColRatio} < TPD_{RowRatio}$ and $TPD_{ColRatio} <$ a low threshold, $T_{RatioThreshold}$, the region is split along the column with the minimum pixel density.

Else if $TPD_{RowRatio} < TPD_{ColRatio}$ and $TPD_{RowRatio} <$ a low threshold, $T_{RatioThreshold}$, the region is split along the row with the minimum pixel density.

For example, the threshold $T_{RatioThreshold}$ may be 0.2.

Referring again to FIG. 8A, for the text region 800, the column with the minimum pixel density 830 has $TPD_{ColMin}$=0.1, and the column with the maximum pixel density 840 has $TPD_{ColMax}$=0.75. Hence, the ratio $TPD_{ColRatio}$=0.13. Similarly, the row with minimum text pixel density 810 has $TPD_{RowMin}$=0.42, and the row with the maximum text pixel density has $TPD_{RowMax}$=0.63. Hence, the ratio $TPD_{RowRatio}$=0.67. $TPD_{ColRatio}$ is less than $TPD_{RowRatio}$ and $T_{RatioThreshold}$, which, according to the split decision step 730, indicates that the text region 800 is to be split along the column with the minimum pixel density 830 into two regions 850 and 860 as shown in FIG. 8B. The region 850 comprises the first three columns, and the region 860 comprises the last three columns.

8. ALTERNATIVE FINDING TEXT REGIONS PROCESS

Figure 9:
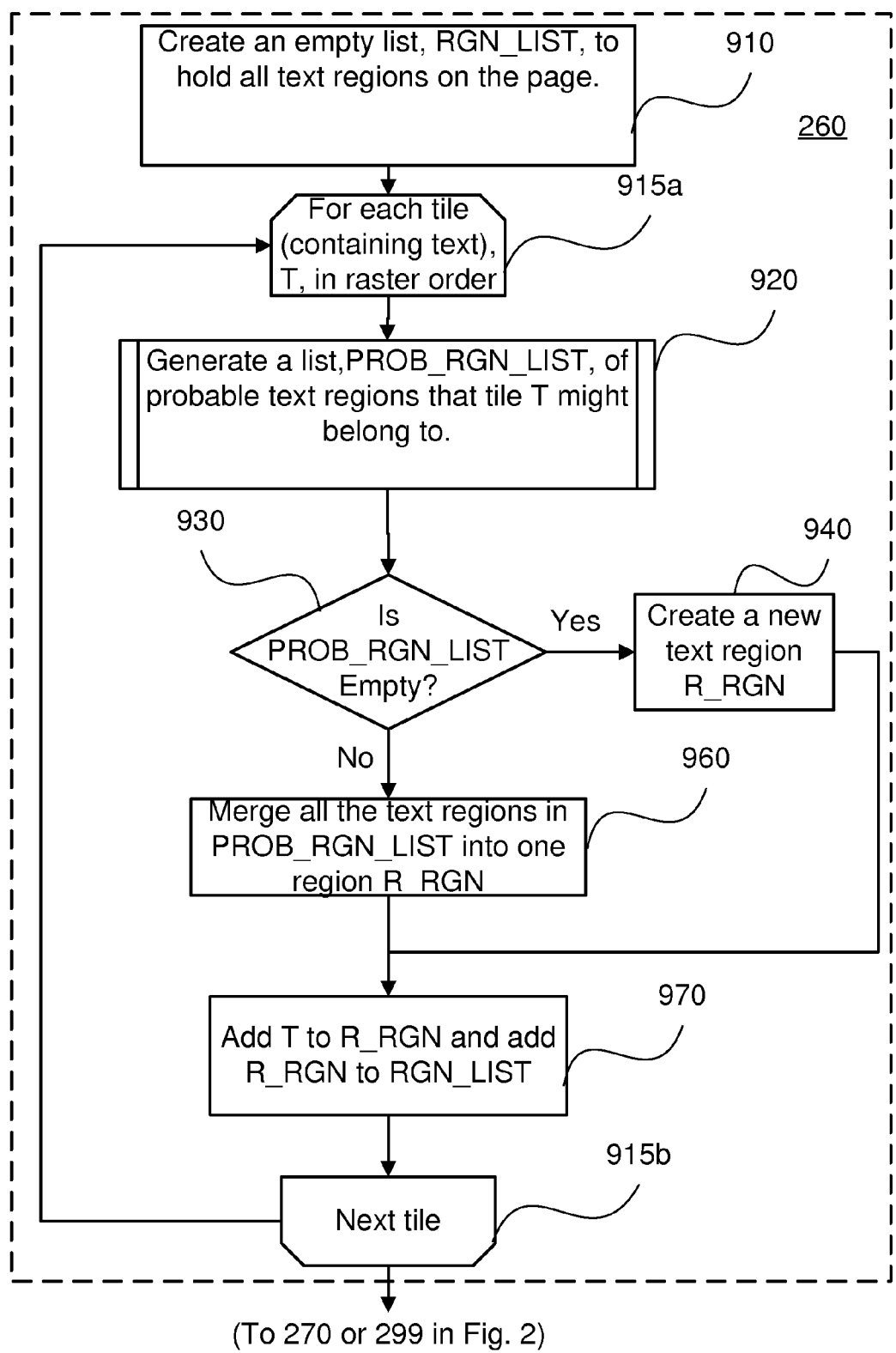
FIG. 9 is a schematic flow diagram illustrating an alternative method of finding text regions as used in the method of FIG. 2.

FIG. 9 is a schematic flow diagram illustrating a process 260 of finding text regions according to an alternative implementation of the invention, such as may be implemented in the text region extracting module 170 of the system 100. The alternative method 260 of FIG. 9 implements a region-growing algorithm based on homogeneity in the tile pixel density statistics produced in the create texture map process 230. In the same fashion as the find text regions process as illustrated in FIG. 7, the tile pixel density for all the tiles is updated in the case where the optional text CC refining module 235 is used.

Referring to FIG. 9, the process 260 starts with a list creating step 910 that creates an empty list, RGN_LIST, to hold all text regions on the document image (i.e., on the page). The region growing algorithm for finding text regions is implemented by examining each tile with non-zero tile pixel density and merging the tile to one of the existing touching text regions. The tile (for-next) iterator 915 fetches tiles (containing text), with non-zero pixel density, in raster order, from top to bottom and left to right, one at a time. A new list of probable text regions that tile T might belong to, PROB_RGN_LIST, is created by the probable region list generating process 920 for the tile T being processed. This PROB_RGN_LIST contains all the possible text regions in the RGN_LIST that the tile T can belong to. This step 920 is described hereinafter in greater detail in section 9 ("Generating List of Probable Text Regions"). In test step 930, a check is made to determine if the probable region list PROB_RGN_LST is empty or null. If the PROB_RGN_LIST is empty (Yes) in step 930, the text region creating step 940, creates a new text region, R_RGN. Processing continues from step 940 at step 970. If the PROB_RGN_LIST contains one or more regions (No) in step 930, all the text regions are merged into a single text region, R_RGN, by text region consolidating step 960. Processing continues from step 960 at step 970. The region adding step 970 adds tile T to the region R_RGN and adds the region R_RGN to the RGN_LIST. The iterator 915 at step 915b processes the next tile T in raster order continuing at step 915a if such a tile is available. Otherwise, if such a tile is not available at step 915b processing continues at step 270 or 299 in FIG. 2.

9. GENERATING LIST OF PROBABLE TEXT REGIONS

Figure 10:
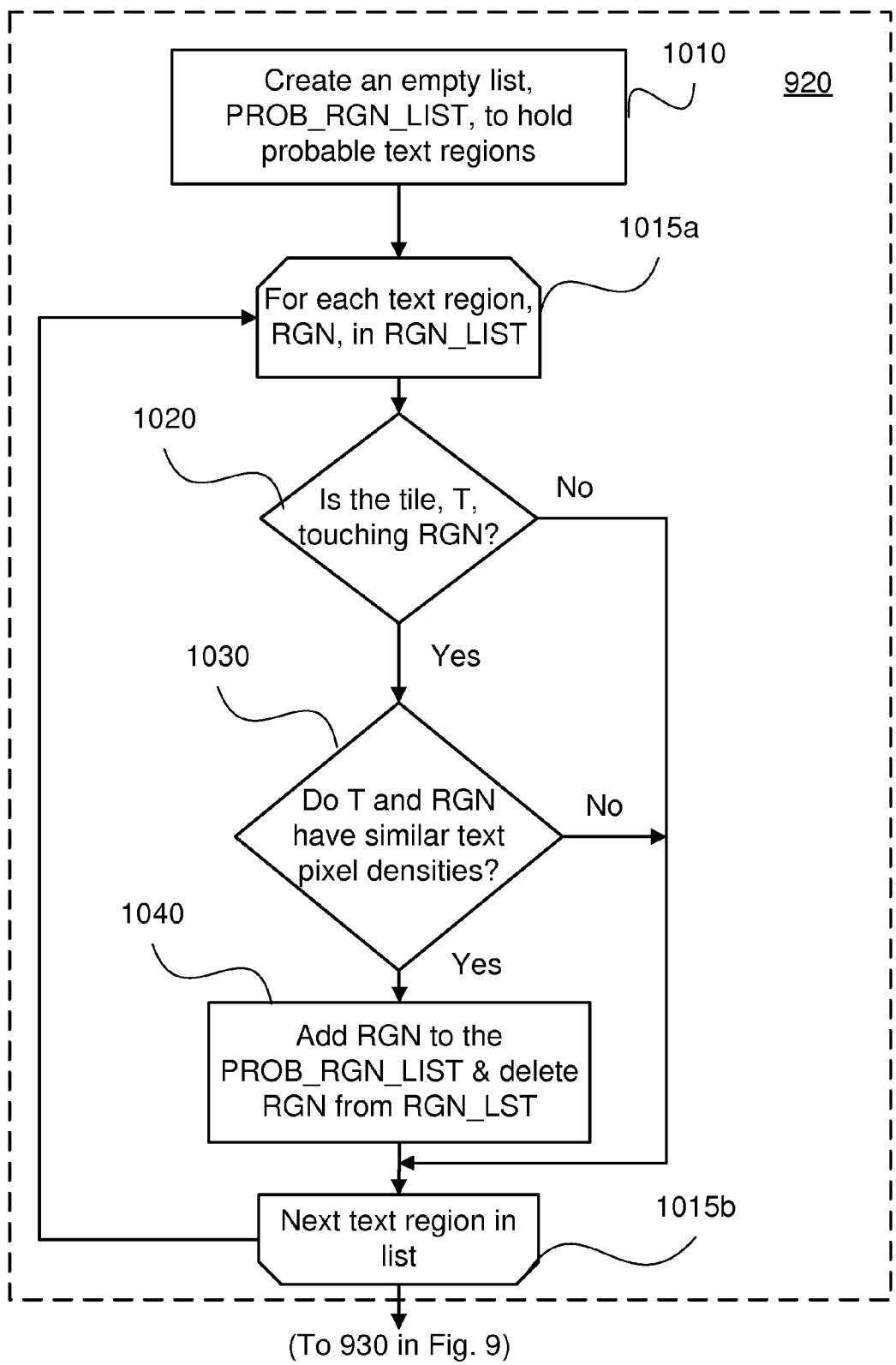
FIG. 10 is a schematic flow diagram of a method for finding possible text regions as used in the method of FIG. 9.

FIG. 10 is a flow diagram showing the details of the probable region list generating process 920 of FIG. 9. The probable region list generating process 920 creates a list of probable text regions, PROB_RGN_LIST, from regions in the RGN_LIST that a tile T can belong to. The probable region list creation step 1010 creates an empty list of probable text regions. An iterator 1015 iterates through each of the regions, RGN, in the region list RGN_LIST. The touching region test step 1020 checks if the region RGN touches the tile T. This test considers tile T to be touching region RGN if the tile T is one of eight neighbours of any tile in the region RGN. If the region is determined to be touching (Yes) in step 1020, the tile pixel density test step 1030 checks if the tile T has a similar text pixel density to the average tile text pixel density of the region RGN. Tile pixel densities of the tile and the region are considered similar if those densities are within a percentage range of each other. The percentage range in this embodiment is 10%. If test steps 1020 and 1030 determine that the tile T is touching (Yes) and has a similar pixel density as the region RGN (yes), the add to list step 1040 adds the region RGN to the PROB_RGN_LIST and deletes the region RGN from the RGN_LIST. Processing continues at step 1015b. Otherwise, with reference to steps 1020 and 1030, if either test step 1020 or 1030 is not satisfied (No), processing continues from step 1020 or 1030 at step 1015b for the next text region in the list to be processed. This process continues until there are no more untested regions in RGN_LIST. When there are no more untested text regions at step 1015b, processing continues at step 930 in FIG. 9.

Figure 11A:
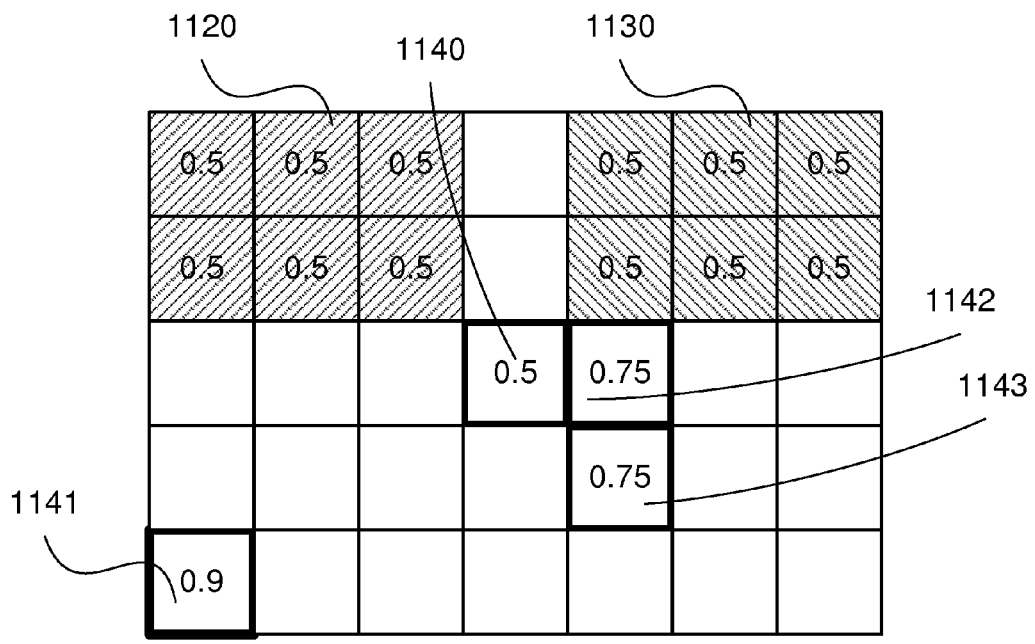
FIG. 11A is an example of text regions formed part way through finding text regions.
Figure 11B:
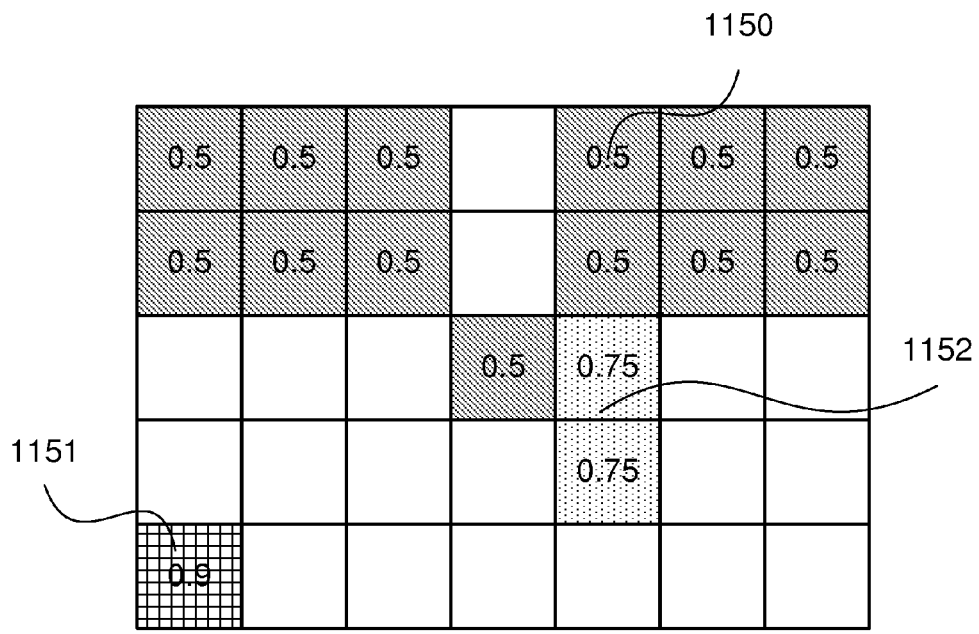
FIG. 11B is a diagram of the text groups formed after the alternative method of finding text regions of FIG. 9 is used on the example given in FIG. 11A.

FIG. 11A and FIG. 11B, when considered together, illustrate the formation of text regions. FIG. 11A shows text regions part way through processing. Text regions 1120 and 1130 are text regions already created. FIG. 11B shows the text regions after processing all the tiles in FIG. 11A. A tile 1140 touches both text regions 1120 and 1130 (a tile is considered to be touching a text region if any of the tiles in the text region is one of its eight neighbours) and has a similar pixel density to the average pixel density of the regions 1120 and 1130. The two text regions 1130, 1120 and this tile 1140 are merged to form one text region 1150 as shown in FIG. 11B. Tile 1142 in FIG. 11A shows a tile that is touching text region 1130 but is not similar to the text region 1130 in pixel density and hence a new text region 1152 is formed for this tile, as shown in FIG. 11B. The tile 1143, which is processed after tile 1142, in FIG. 11A touches the text region 1152 and has a similar pixel density, and hence forms part of that region 1152 in FIG. 11B. The tile 1141 of FIG. 11A (lower left corner) is not touching any of the text regions 1150, 1152 and hence forms a new text region 1151, as shown in FIG. 11B.

10. INDUSTRIAL APPLICABILITY

The arrangements described are applicable to the computer and data processing industries and particularly for digital photo albums.

Methods, apparatuses, and computer program products for finding a region containing text in a colour bitmap image comprising a plurality of pixels have been described. The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

We claim:

1. A method of finding a region containing text in a colour bitmap image comprising a plurality of pixels, the method comprising the steps of:
    generating connected components (CCs) from the colour bitmap image by grouping substantially similarly coloured and adjacent pixels;
    determining, independently of colour, which of the connected components are text connected components dependent upon attributes of the generated connected components;
    assigning, for each text connected component (CC), a value to each tile that comprises at least a portion of the text connected component, said value indicating the presence of text overlapping the tile, each tile comprising a plurality of pixels of said colour bitmap image; and
    determining the region containing text in the colour bitmap image dependent upon said assigned values of the tiles.

2. The method as claimed in claim 1, comprising dividing the colour bitmap image into a plurality of tiles.

3. The method as claimed in claim 1, wherein said value indicating the presence of text overlapping the tile comprises a text pixel density of the text connected component in the tile, or a text CC count density of the text connected component in the tile.

4. The method as claimed in claim 1, wherein said assigning step comprises:
   initialising geometric distribution statistics contained in each tile;
   for each text CC, generating and distributing statistical measures pertaining to the current text CC into the geometric distribution statistics of each tile that is overlapped by the current text CC; and
   for each tile, finalising the geometric distribution statistics of the current tile.

5. The method as claimed in claim 4, wherein said generating and distributing step comprises:
   calculating the number of overlapped tiles;
   dividing a text pixel count by said number of overlapped tiles;
   accumulating said divided text pixel count to a corresponding text total pixel count in all overlapped tiles;
   accumulating a fraction of one divided by said number of overlapped tiles to the corresponding text CC count in all overlapped tiles; and
   updating a corresponding minimum pixel count of a text CC and a maximum pixel count of a text CC by said divided text pixel count in all overlapped tiles.

6. The method as claimed in claim 5, wherein said finalising step comprises:
   setting the average number of pixels per text CC in the tile by the value of dividing the total text pixel count by text CC count in each tile; and
   setting the tile text pixel density by the value of dividing the total text pixel count by the total number of pixels in the tile.

7. The method as claimed in claim 1, wherein the region determining step comprises dividing an initial region into one or more regions comprising text dependent upon average pixel densities along rows and columns of tiles in a text region.

8. The method as claimed in claim 7, wherein region determining step comprises:
   creating an initial text region; and
   wherein said dividing step comprises, for each region:
      calculating average pixel densities along rows and columns of tiles in the current text region;
      determining if the current text region should be split dependent upon the calculated average pixel densities; and
      splitting the current region into at least two regions if the current region is determined should be split.

9. The method as claimed in claim 1, wherein the region determining step comprises growing one or more text regions comprising text using one or more tiles comprising text.

10. The method as claimed in claim 9, wherein region determining step comprises:
    creating an empty list to hold text regions; and
    wherein said growing step comprises, for each tile containing text:
       generating a list of probable text regions that the current tile might belong to;
       providing a text region dependent upon the list of probable text regions; and
       adding the current tile to the text region and adding the text region to the list to hold text regions.

11. The method as claimed in claim 1, further comprising the step of refining text connected components dependent upon noise characteristics, wherein text and noise in said colour bitmap image are discriminated.

12. The method as claimed in claim 11, wherein said noise comprises at least one of watermark, texture, and halftone noise.

13. The method as claimed in claim 11, wherein said text CC refining step comprises
    receiving geometric distribution statistics for each tile; and
    determining noise characteristics of said colour bitmap image dependent upon geometric distribution statistics in each tile, the noise in said colour bitmap image being either primarily watermark noise or non-watermark noise.

14. The method as claimed in claim 13, wherein said noise characteristics determining step comprises:
    profiling said geometric distribution statistics in each tile to determine characteristics of noise; and
    identifying locations of noise based on said characteristics of noise.

15. The method as claimed in claim 14, further comprising reclassifying text CCs matching said noise characteristics at said locations.

16. The method as claimed in claim 14, wherein said profiling step comprises:
    forming a histogram on an average text pixel count per text CC in each tile, wherein bins are partitioned to capture characteristics of noise; and
    collecting statistics in each bin including at least one of maximum text pixel count per text CC of an included tile, included tile count, mean of text pixel count per text CC per included tile, standard deviation of text pixel count per text CC per included tile, mean of text CC count per included tile and standard deviation of text CC count per included tile.

17. The method as claimed in claim 14, wherein said identifying step comprises:
    determining the type of majority noise based on an identity of the largest bin, the type of noise being categorised into watermark noise and non-watermark noise;
    deriving at least one text CC count threshold and at least one text pixel count per text CC threshold from said statistics of the largest bin if the type of majority noise is determined to be watermark noise;
    marking tiles with said geometric statistics satisfying said at least one text CC count threshold and at least one text pixel count per text CC threshold as noisy tiles;
    marking tiles adjacent to said noisy tiles with said geometric statistics close to said at least one text CC count threshold and at least one text pixel count per text CC threshold as noisy tiles;
    marking tiles with said geometric statistics indicating a dense cluster of small text CCs or a sparse cluster of very small text CCs as noisy tiles if the type of majority noise is determined to be non-watermark noise.

18. The method as claimed in claim 15, wherein said matching step checks each text CC for combinations of these characteristics:
    a pixel count lower than said at least one pixel count per text CC threshold if the type of majority noise is determined to be watermark noise;
    a pixel count lower than a predetermined pixel count threshold if the type of majority noise is determined to be non-watermark noise; and
    a bounding box overlapping any noisy tiles for both noise types or a bounding box surrounded by more than three (3) noisy tiles if the type of majority noise is determined to be watermark noise.

19. An apparatus for finding a region containing text in a colour bitmap image comprising a plurality of pixels, the apparatus comprising:
- a memory for storing data and a computer program; and
- a processor unit coupled to the memory for executing a computer program, said memory and said processor configured to find the region containing text in the colour bitmap image, the computer program comprising:
- computer program code means for generating connected components (CCs) from the colour bitmap image by grouping substantially similarly coloured and adjacent pixels;
- computer program code means for determining, independently of colour, which of the connected components are text connected components dependent upon attributes of the generated connected components;
- computer program code means for assigning, for each text connected component (CC), a value to each tile that comprises at least a portion of the text connected component, said value indicating the presence of text overlapping the tile, each tile comprising a plurality of pixels of said colour bitmap image; and
- computer program code means for determining the region containing text in the colour bitmap image dependent upon said assigned values of the tiles.

20. A computer readable storage medium having recorded therein a computer program for finding a region containing text in a colour bitmap image comprising a plurality of pixels, the computer program comprising:
- computer program code means for generating connected components (CCs) from the colour bitmap image by grouping substantially similarly coloured and adjacent pixels;
- computer program code means for determining, independently of colour, which of the connected components are text connected components dependent upon attributes of the generated connected components;
- computer program code means for assigning, for each text connected component (CC), a value to each tile that comprises at least a portion of the text connected component, said value indicating the presence of text overlapping the tile, each tile comprising a plurality of pixels of said colour bitmap image; and
- computer program code means for determining the region containing text in the colour bitmap image dependent upon said assigned values of the tiles.

* * * * *